US011990020B2

(12) United States Patent
Glynn et al.

(10) Patent No.: US 11,990,020 B2
(45) Date of Patent: May 21, 2024

(54) DEVICE, SYSTEM AND METHOD FOR HEALTH AND SAFETY MONITORING

(71) Applicant: Makusafe Corp., West Des Moines, IA (US)

(72) Inventors: Gabriel Glynn, West Des Moines, IA (US); Mark Frederick, West Des Moines, IA (US); Matt McMullen, West Des Moines, IA (US)

(73) Assignee: Makusafe Corp., West Des Moines, IA (US)

(*) Notice: Subject to any disclaimer, the term of this patent is extended or adjusted under 35 U.S.C. 154(b) by 0 days.

(21) Appl. No.: 17/977,707

(22) Filed: Oct. 31, 2022

(65) Prior Publication Data

US 2023/0110596 A1 Apr. 13, 2023

Related U.S. Application Data

(63) Continuation of application No. 17/313,514, filed on May 6, 2021, now Pat. No. 11,527,142, which is a continuation-in-part of application No. 16/689,303, filed on Nov. 20, 2019, now Pat. No. 11,030,875, which is a continuation of application No. 16/124,287, filed on Sep. 7, 2018, now Pat. No. 10,522,024, which is a continuation of application No. 15/614,835, filed on Jun. 6, 2017, now Pat. No. 10,096,230.

(60) Provisional application No. 63/024,545, filed on May 14, 2020, provisional application No. 62/346,231, filed on Jun. 6, 2016.

(51) Int. Cl.
*G08B 21/14* (2006.01)
*G08B 21/04* (2006.01)
*G08B 25/01* (2006.01)

(52) U.S. Cl.
CPC ......... *G08B 21/14* (2013.01); *G08B 21/0446* (2013.01); *G08B 21/0469* (2013.01); *G08B 25/016* (2013.01)

(58) Field of Classification Search
CPC ............... G08B 21/14; G08B 21/0446; G08B 21/0469; G08B 25/016
See application file for complete search history.

(56) References Cited

U.S. PATENT DOCUMENTS 7,705,723 B2 4/2010 Kahn
8,795,168 B2 8/2014 Goh
(Continued)

*Primary Examiner* — John A Tweel, Jr.
(74) *Attorney, Agent, or Firm* — BrownWinick Law Firm; Christopher A. Proskey

(57) ABSTRACT

A system for monitoring health and safety of workers in a manufacturing facility is presented. The system a user interface, a set of sensors, a database, management software and/or a health monitoring system, among other components. The system is configured to monitor health of workers using biometric data gathered by the set of sensors. In one or more arrangements, the system also tracks the position and motion of the worker. In one or more arrangements, the data gathered is aggregated in a database for datamining purposes so as to facilitate health monitoring and mitigation of identified illness. The system may be configured to screen and identify workers who are not in normal health. The system may be configured to screen workers health when clocking into or out of the time keeping system. The system may be configured to perform contact tracing.

19 Claims, 22 Drawing Sheets

(56) References Cited

U.S. PATENT DOCUMENTS

| | | | | |
|---|---|---|---|---|
| 9,659,484 | B1 | 5/2017 | Mehta | |
| 9,721,456 | B2 | 8/2017 | Thurlow | |
| 10,096,230 | B2 | 10/2018 | Glynn | |
| 10,460,592 | B2 * | 10/2019 | Thurlow | G08B 21/182 |
| 10,522,024 | B2 | 12/2019 | Glynn | |
| 11,030,875 | B2 | 6/2021 | Glynn | |
| D937,828 | S | 12/2021 | Glynn | |
| D938,415 | S | 12/2021 | Glynn | |
| 11,527,142 | B2 | 12/2022 | Glynn | |
| 2005/0073426 | A1 | 4/2005 | Hines | |
| 2007/0106775 | A1 | 5/2007 | Wong | |
| 2008/0180243 | A1 | 7/2008 | Aaron | |
| 2009/0121931 | A1 | 5/2009 | Katz | |
| 2010/0099461 | A1 | 4/2010 | Rahfaldt | |
| 2010/0241465 | A1 | 9/2010 | Amigo | |
| 2013/0103428 | A1 | 4/2013 | Molinsky | |
| 2013/0271264 | A1 | 10/2013 | Page | |
| 2014/0266793 | A1 | 9/2014 | Velado | |
| 2017/0024531 | A1 | 1/2017 | Malaviya | |
| 2017/0127257 | A1 | 5/2017 | Saxena | |
| 2017/0140637 | A1 | 5/2017 | Thurlow | |
| 2017/0330446 | A1 | 11/2017 | Thurlow | |
| 2017/0352242 | A1 | 12/2017 | Glynn | |
| 2018/0052970 | A1 | 2/2018 | Boss | |
| 2020/0297250 | A1 | 9/2020 | Elhawary | |
| 2021/0264764 | A1 | 8/2021 | Glynn | |
| 2022/0147889 | A1 | 5/2022 | Frederick | |

* cited by examiner

DEVICE, SYSTEM AND METHOD FOR HEALTH AND SAFETY MONITORING

CROSS-REFERENCE TO RELATED APPLICATIONS

The present application is a continuation of U.S. Utility application Ser. No. 17/313,514 filed on May 6, 2021 and titled DEVICE, SYSTEM AND METHOD FOR HEALTH AND SAFETY MONITORING, which claims priority to U.S. Provisional Application No. 63/024,545 filed on May 14, 2020 and titled DEVICE, SYSTEM AND METHOD FOR HEALTH AND SAFETY MONITORING and which is a continuation-in-part of U.S. Utility application Ser. No. 16/689,303 filed on Nov. 20, 2019 and titled SAFETY DEVICE, SYSTEM AND METHOD OF USE, which is a continuation of U. S. Utility application Ser. No. 16/124,287 filed on Sep. 7, 2018 and titled SAFETY DEVICE, SYSTEM AND METHOD OF USE, which is a continuation of U.S. Utility application Ser. No. 15/614,835 filed on Jun. 6, 2017 and titled SAFETY DEVICE, SYSTEM AND METHOD OF USE, and which claims priority to U.S. Provisional Application No. 62/346,231 filed on Jun. 6, 2016 and titled SAFETY DEVICE, SYSTEM AND METHOD OF USE, each of which is hereby incorporated by reference herein in its entirety, including any figures, tables, or drawings or other information.

FIELD OF THE DISCLOSURE

This disclosure relates to a safety device. More specifically and without limitation, this disclosure relates to a wearable safety device, system and method of use that is used to track and analyze worker health, workplace accidents, and the environmental conditions surrounding workplace accidents.

OVERVIEW OF THE DISCLOSURE

Injuries at work are tremendously costly for both the corporation as well as the injured worker. As an example, it is estimated that 2016 will again see nearly 100 billion dollars in workers compensation claims. It is estimated that the average claim in the United State in 2016 will amount to over $100,000.

Most, if not all, of these work-related injuries are avoidable. In view of the personal cost to the injured worker and the financial cost to the employer, a great amount of energy and effort has been placed on avoiding workplace injuries. Many employers have implemented various systems to avoid accidents ranging from common sense solutions to sophisticated systems, from establishing safety teams and safety managers to hiring third-party safety auditors, and everything in-between. However, despite these many efforts, avoidable injuries continue to occur at an alarming pace.

Due to the complex nature of today's modern manufacturing facility, the root causes of these workplace injuries are often difficult to discern. This is true, even after an injury has occurred. This complexity makes it even more difficult to predict when, where, why, and how an injury may occur in the future.

With that said, information is available that may help shed light on dangerous conditions or situations within a manufacturing facility. However, collecting this information, especially in aggregate, has never before been possible or attempted.

In addition, while every worker and employer want to avoid workplace injuries, reporting information that relates to worker safety is sometimes a sensitive topic. This is because some workers do not want to be seen as complainers or tattletales and other workers just don't care enough to take active steps to improve workplace safety. As such, much of the information that may help avoid future workplace injuries, such as near misses or perceptively dangerous conditions, often goes unreported or uncollected.

Complicating matters further, when information is reported, it is often subjective and very much up to interpretation by both the party providing the information as well as the party receiving the information. However, again, there is not available on the market, a system or device that collects aggregate information about the environmental conditions of a workplace in an unbiased manner that may be used to determine and/or predict safety conditions and therefore help prevent workplace injuries.

In addition to injuries, contagious illness in the workplace can pose significant costs to both the corporation as well as infected workers including medical costs, lost wages, and/or reduced productivity. It is estimated that the average annual total economic burden of influenza to the healthcare system and society is $11.2 billion. Due to lack of medical leave, difficulty of scheduling replacements, or need for income, contagious workers may feel the need to work, which may increase the risk that other employees may be infected.

Therefore, there is a need in the art to provide a safety device, system, and method of use for collecting, reporting, and analyzing information about the environmental conditions of a workplace that can be used to reduce work place injuries and monitor health of workers to reduce the spread of contagious diseases.

Thus, it is a primary object of the disclosure to provide a safety device, system and method of use that improves upon the state of the art.

Another object of the disclosure is to provide a safety device, system and method of use that standardizes the collection of information about the environmental conditions of a workplace.

Yet another object of the disclosure is to provide a safety device, system and method of use that does not penalize any one employee for reporting information about the environmental conditions of a workplace.

Another object of the disclosure is to provide a safety device, system and method of use that aggregates a great amount of information about the environmental conditions of a workplace.

Yet another object of the disclosure is to provide a safety device, system and method of use that eliminates bias in the collection of information about the environmental conditions of a workplace.

Another object of the disclosure is to provide a safety device, system and method of use that eliminates the inconsistency in reporting information about the environmental conditions of a workplace.

Yet another object of the disclosure is to provide a safety device, system and method of use that provides workers the ability to quickly and easily report notable events, suggestions, near misses or any other information at the moment the information or suggestion occurs and in an easy, fast, and contemporaneous manner.

Another object of the disclosure is to provide a safety device, system and method of use that allows for the prediction of future workplace injuries.

Yet another object of the disclosure is to provide a safety device, system and method of use that allows for the elimination of future workplace injuries.

Another object of the disclosure is to provide a safety device, system and method of use that provides insight into the safety conditions of a workplace.

Yet another object of the disclosure is to provide a safety device, system and method of use that allows for the identification of patterns in safety conditions.

Another object of the disclosure is to provide a safety device, system and method of use that reports information about the environmental conditions of a workplace without substantially inconveniencing workers.

Yet another object of the disclosure is to provide a safety device, system and method of use that provides notifications if safety thresholds are approached or exceeded.

Another object of the disclosure is to provide a safety device, system and method of use that improves the access to information about the environmental conditions of a workplace.

Yet another object of the disclosure is to provide a safety device, system and method of use that improves the visibility to information about the environmental conditions of a workplace.

Another object of the disclosure is to provide a safety device, system and method of use that reduces workplace injuries.

Yet another object of the disclosure is to provide a safety device, system and method of use that improves the safety and health of workers and workplaces.

Another object of the disclosure is to provide a safety device, system and method of use that is safe to use.

Yet another object of the disclosure is to provide a safety device, system and method of use that is easy to use.

Another object of the disclosure is to provide a safety device, system and method of use that is efficient to use.

Yet another object of the disclosure is to provide a safety device, system and method of use that provides a unique solution.

Another object of the disclosure is to provide a safety device, system and method of use that is cost effective.

Yet another object of the disclosure is to provide a safety device, system and method of use that is durable.

Another object of the disclosure is to provide a safety device, system and method of use that is robust.

Yet another object of the disclosure is to provide a safety device, system and method of use that can be used with a wide variety of manufacturing facilities.

Another object of the disclosure is to provide a safety device, system and method of use that is relatively inexpensive.

Yet another object of the disclosure is to provide a safety device, system and method of use that has a long useful life.

Another object of the disclosure is to provide a safety device, system and method of use that is high quality.

Yet another object of the disclosure is to provide a safety device, system and method of use that is convenient.

Another object of the disclosure is to provide a safety device, system and method of use that can be used with a wide variety of employees.

Yet another object of the disclosure is to provide a safety device, system and method of use that provides high quality data.

Another object of the disclosure is to provide a safety device, system and method of use that provides data and information that can be relied upon.

Yet another object of the disclosure is to provide a safety device, system and method of use that allows for reduced response time to potential safety and health issues.

Another object of the disclosure is to provide a safety device, system and method of use that allows for companies to compare the safety of their facilities to other facilities inside the same company and outside the company to determine how safe their facilities are in comparison.

Yet another object of the disclosure is to provide a system safety device, system and method of use that facilitates tracking clock in and clock out times for worker shifts and reporting information about the environmental conditions of a workplace.

Another object of the disclosure is to provide a device, system and method of use that standardizes the collection of information related to health of workers in the workplace.

Yet another object of the disclosure is to provide a system safety device, system and method of use that monitors health of workers.

Another object of the disclosure is to provide a device, system, and method of use that screens workers for signs of fever.

Yet another object of the disclosure is to provide a system safety device, system and method of use that facilitates tracking clock in and clock out times for worker shifts.

Another object of the disclosure is to provide a device, system and method of use that facilitates monitoring and/or control over access to company resources by workers.

Another object of the disclosure is to provide a safety device, system and method of use that aggregates a great amount of information related to employee health to facilitate data analytics.

Yet another object of the disclosure is to provide a safety device, system and method of use that facilitates contact tracing of workers after identifying a contagious worker.

Another object of the disclosure is to provide a safety device, system and method of use that facilitates monitoring, management, and/or improvement of health safety policies.

Yet another object of the disclosure is to provide a safety device, system and method of use that provides insight into the health conditions of a workplace.

Another object of the disclosure is to provide a safety device, system and method of use that reports information about the health conditions of workers without substantially inconveniencing workers.

Yet another object of the disclosure is to provide a safety device, system and method of use that provides notifications if health safety polices are violated.

Another object of the disclosure is to provide a safety device, system and method of use that reduces workplace illness.

These and countless other objects, features, or advantages of the present disclosure will become apparent from the specification, figures, and claims.

SUMMARY OF THE DISCLOSURE

In one or more arrangements, a system for monitoring safety and health of workers is presented. In one or more arrangements, the system includes a user interface, a set of sensors, a database, management software and/or a health monitoring system, among other components. The system is configured to monitor health and safety of workers using environmental, biometric data, and/or other gathered by the set of sensors.

In one or more arrangements, the system also tracks the position of the worker and includes an accelerometer that detects motion. In one or more arrangements, the data gathered by the sensors is aggregated in a database for datamining purposes so as to facilitate health monitoring and mitigation of identify illness. In one or more arrangements, the system is configured to screen and identify workers who are not in normal health. In one or more arrangements, the system includes a time keeping system, and is configured to screen workers health when clocking into or out of the time keeping system. In one or more arrangements, the system is configured to perform contact tracing of a contagious worker to identify other workers who may have been in recent contact with the worker. In one or more arrangements, the system is configured to maintain personalized health profiles for workers based on data acquired from the sensors and identify when deviations from the personalized health profiles occur.

BRIEF DESCRIPTION OF THE DRAWINGS

FIG. 9A is an elevation view of the top side of the system shown in FIGS. 5 through 9, the view showing the core fully inserted within the opening of the holster; the view showing the band removed; the view showing a light pipe positioned in the core that provides access for light in the environment to be sensed by a light sensor; the view also showing a plurality of openings in the core that provides access to other sensors in the core, such as a sound sensor and an air quality sensor, or the like.

DETAILED DESCRIPTION OF THE DISCLOSURE

Figure 1:
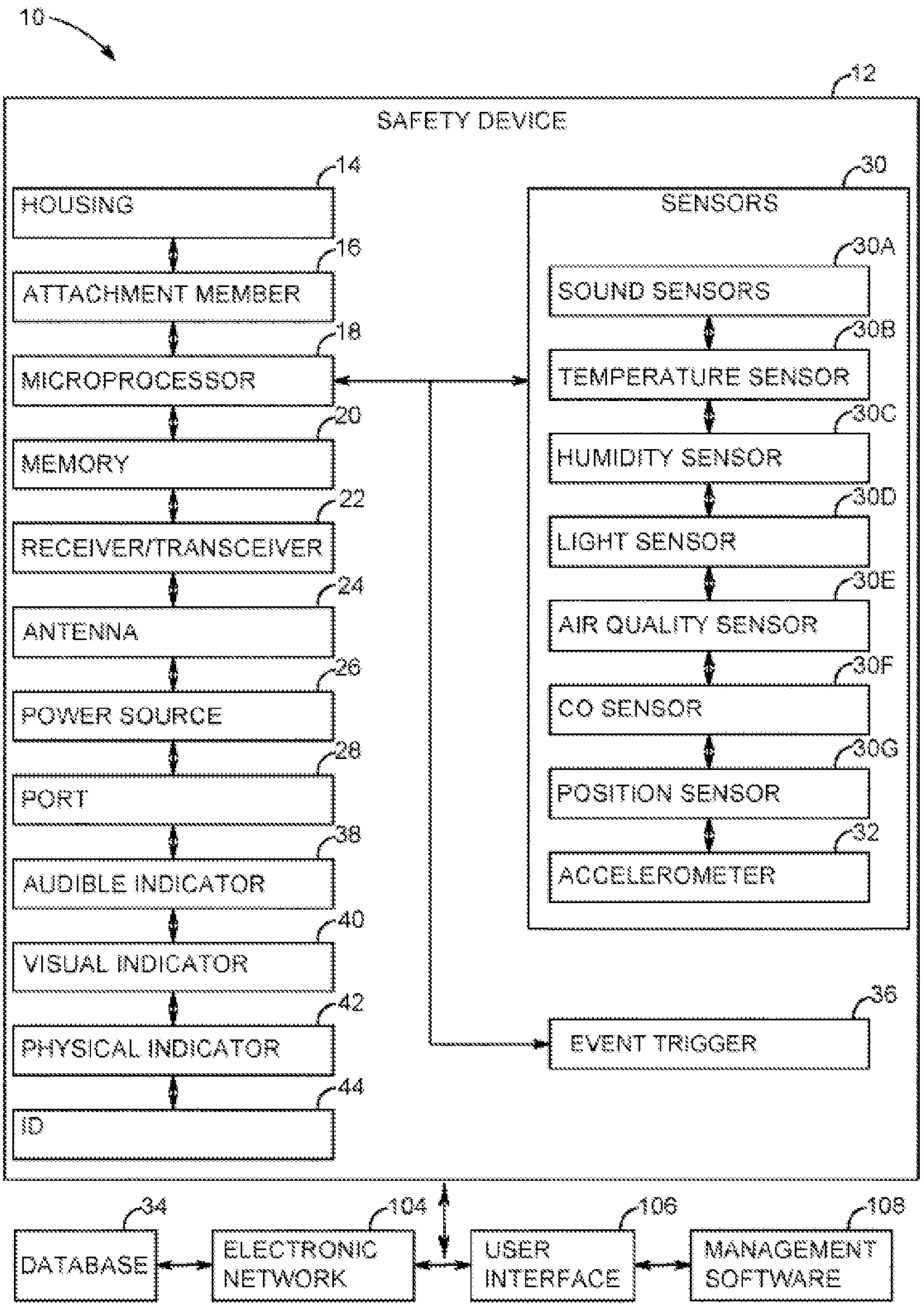
FIG. 1 is a plan view of the system including a safety device having a housing or core, an attachment member, at least one microprocessor, at least one memory, a receiver and/or transceiver, an antenna, a power source, a port, an audible indicator, a visual indicator, a physical indicator, an ID, and a plurality of sensors including sound sensors, temperature sensors, humidity sensors, light sensors, air quality sensors, CO censors, position sensors and an accelerometer, to name a few, the safety device also includes an event trigger; the safety device is included as part of a system including a database, an electronic network, a user interface and management software; the system facilitates the collection and analyzation of worker activities and movements and facilitates the detection, tracking, identification and response to accidents, near misses and notable events or suggestions.
Figure 2:
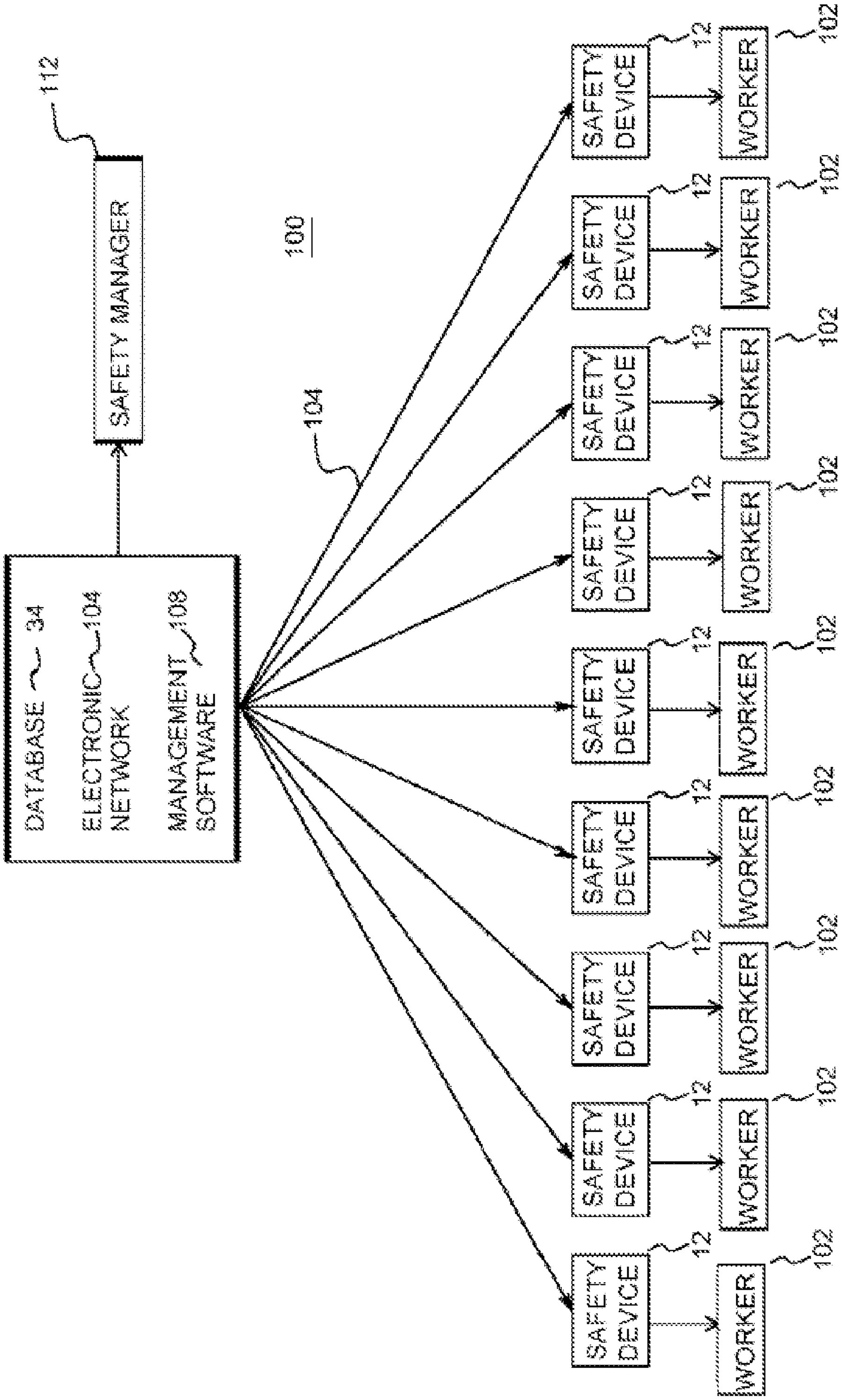
FIG. 2 is a plan view of the system described in FIG. 1, the view showing a plurality of safety devices, each assigned to a worker; the view showing these safety devices in communication with the database, electronic network and management software; the view showing information from the safety devices flowing to a safety manager for the safety manager's attention to the information provided by the safety devices including to accidents, near misses and notable events or suggestions.
Figure 3:
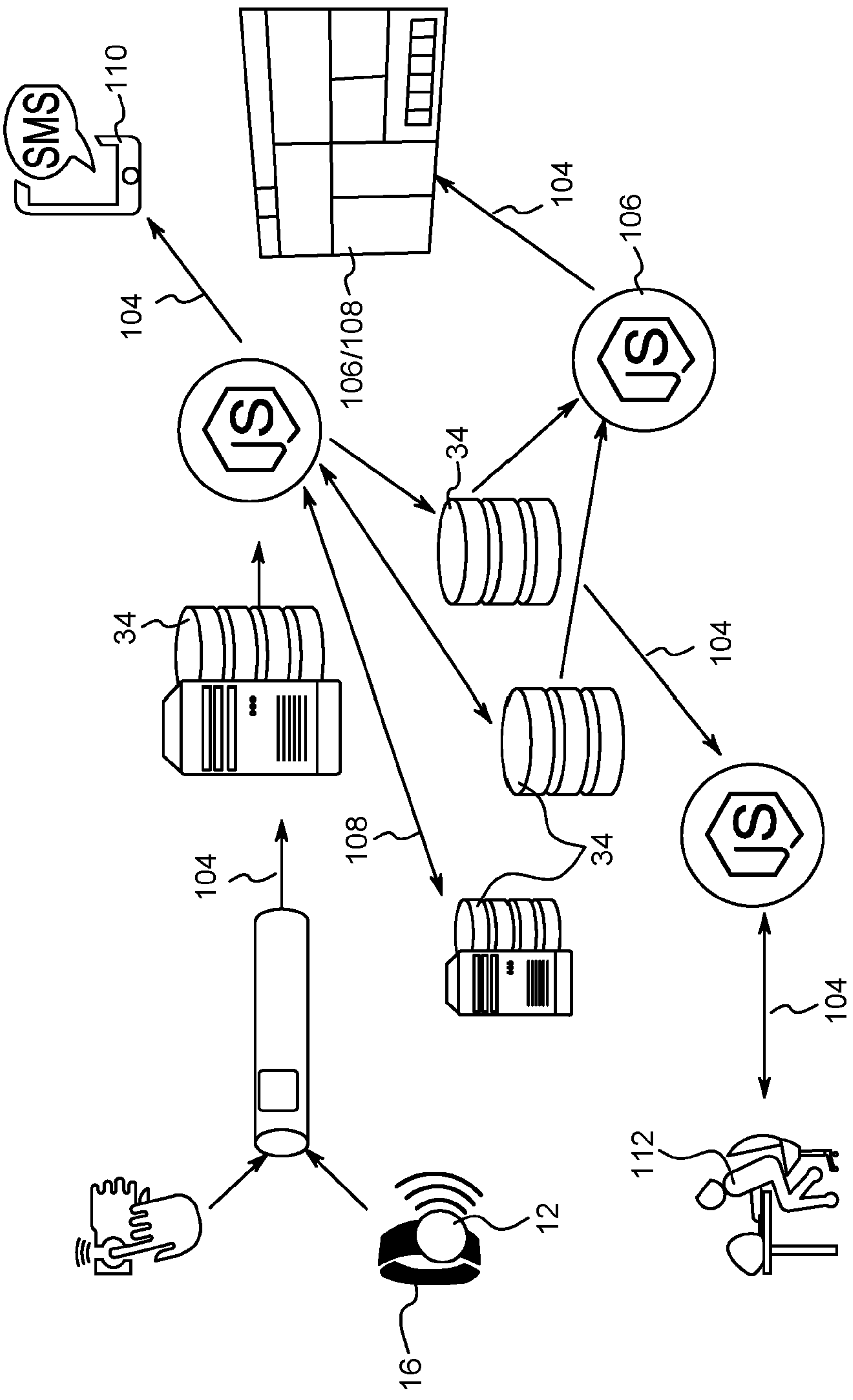
FIG. 3 is a plan view of the system described in FIGS. 1 and 2, the view showing a safety device in electronic communication with the components of the system including a database, user interface and management software, the view also showing the safety device in communication with a safety manager and/or in communication with the electronic device of a safety manager.
Figure 4:
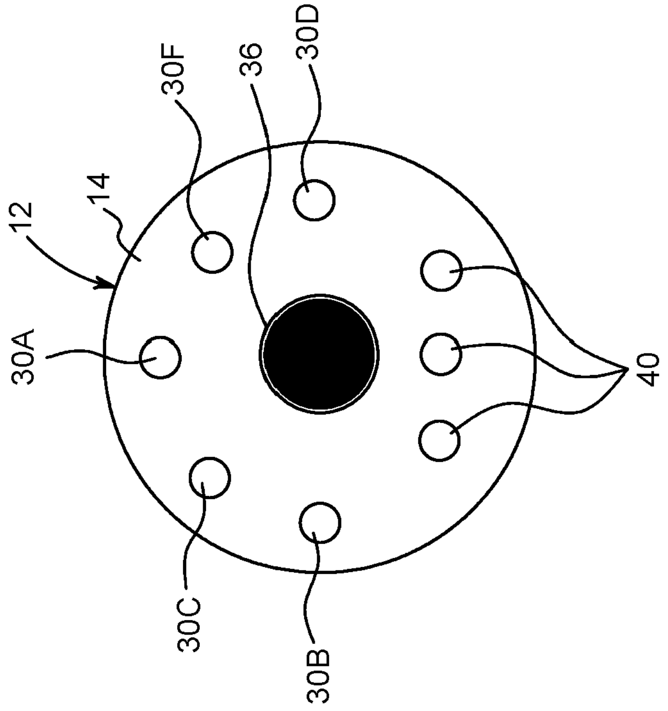
FIG. 4 is an elevation view of one configuration of a safety device, the view showing a core having a generally circular peripheral shape, the view showing the safety device having an event trigger, a plurality of sensors, and a plurality of visual indicators.
Figure 5:
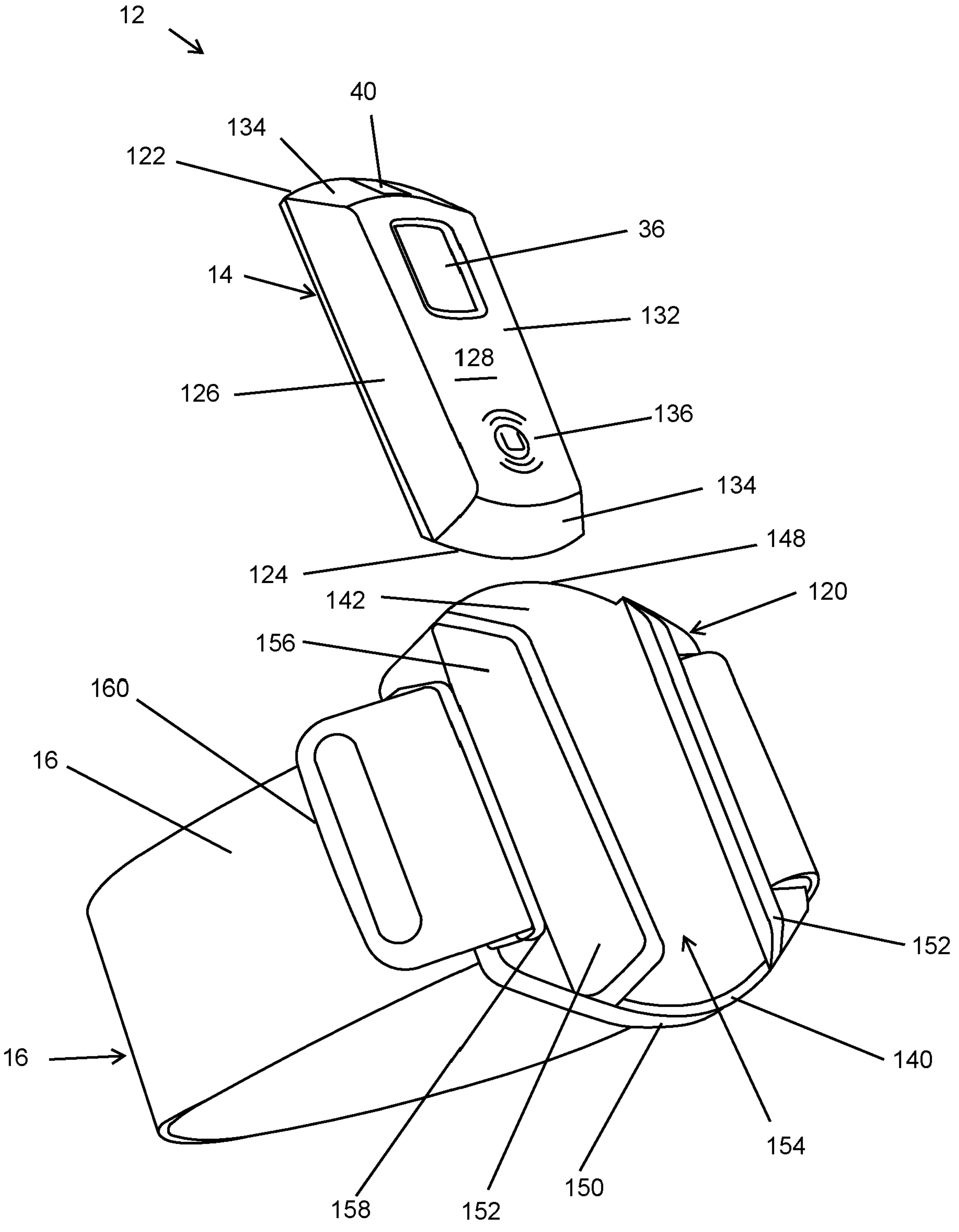
FIG. 5 is a perspective view of another configuration of a safety device, the view showing the safety device having an elongated core having an upper end, lower end, opposing sides, a forward wall, a back wall, and opposing end walls, the safety device having an event trigger positioned within its forward wall, and a visual indicator positioned in its upper end wall; the view showing the core sized and shaped to fit within an opening of a holster, the holster having a back wall and a pair of side walls and a step that are configured to receive and hold the core therein; the view showing the holster connected to an attachment device that is in the form of a band that is configured to fit around the wrist or arm of a worker; the view showing the core about to be inserted within the opening of the holster.
Figure 6:
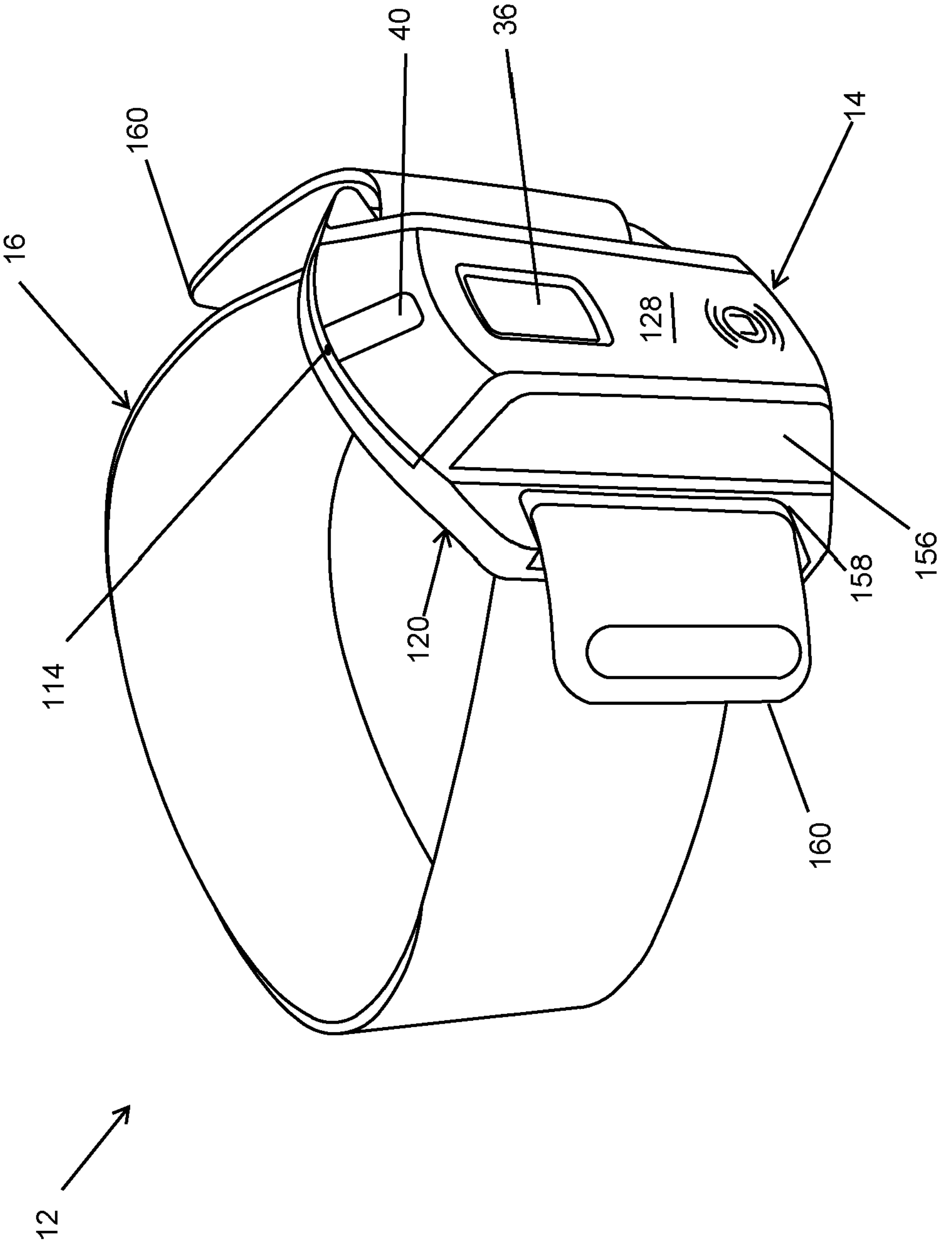
FIG. 6 is a perspective view of the system shown in FIG. 5, the view showing the core fully inserted within the opening of the holster; the view also showing an opening in the upper end of the core to provide access to sensors housed within the hollow interior of the core.
Figure 7:
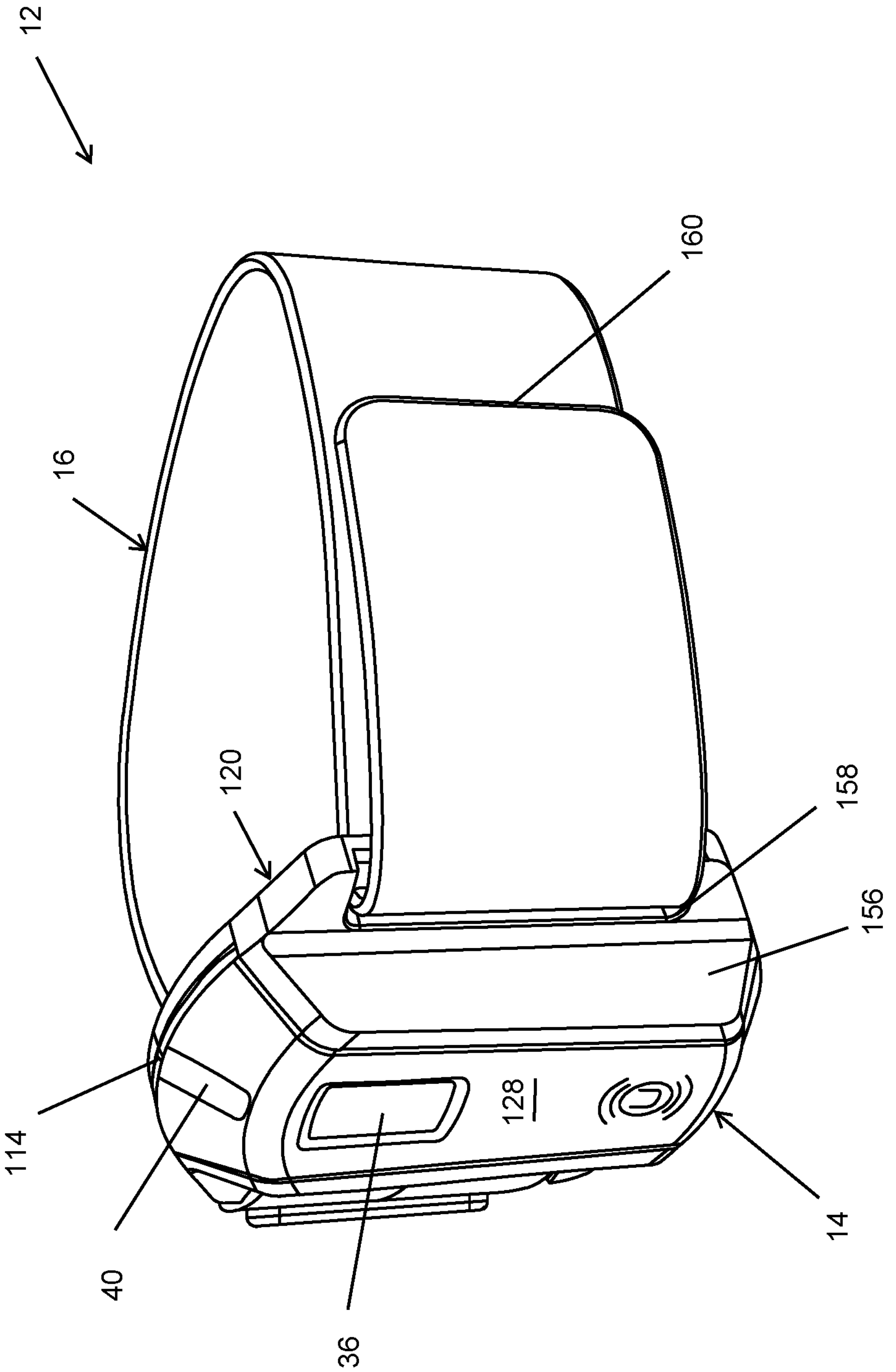
FIG. 7 is another perspective view of the system shown in FIGS. 5 and 6, the view showing the core fully inserted within the opening of the holster; the view also showing an opening in the upper end of the core to provide access to sensors housed within the hollow interior of the core.
Figure 8:
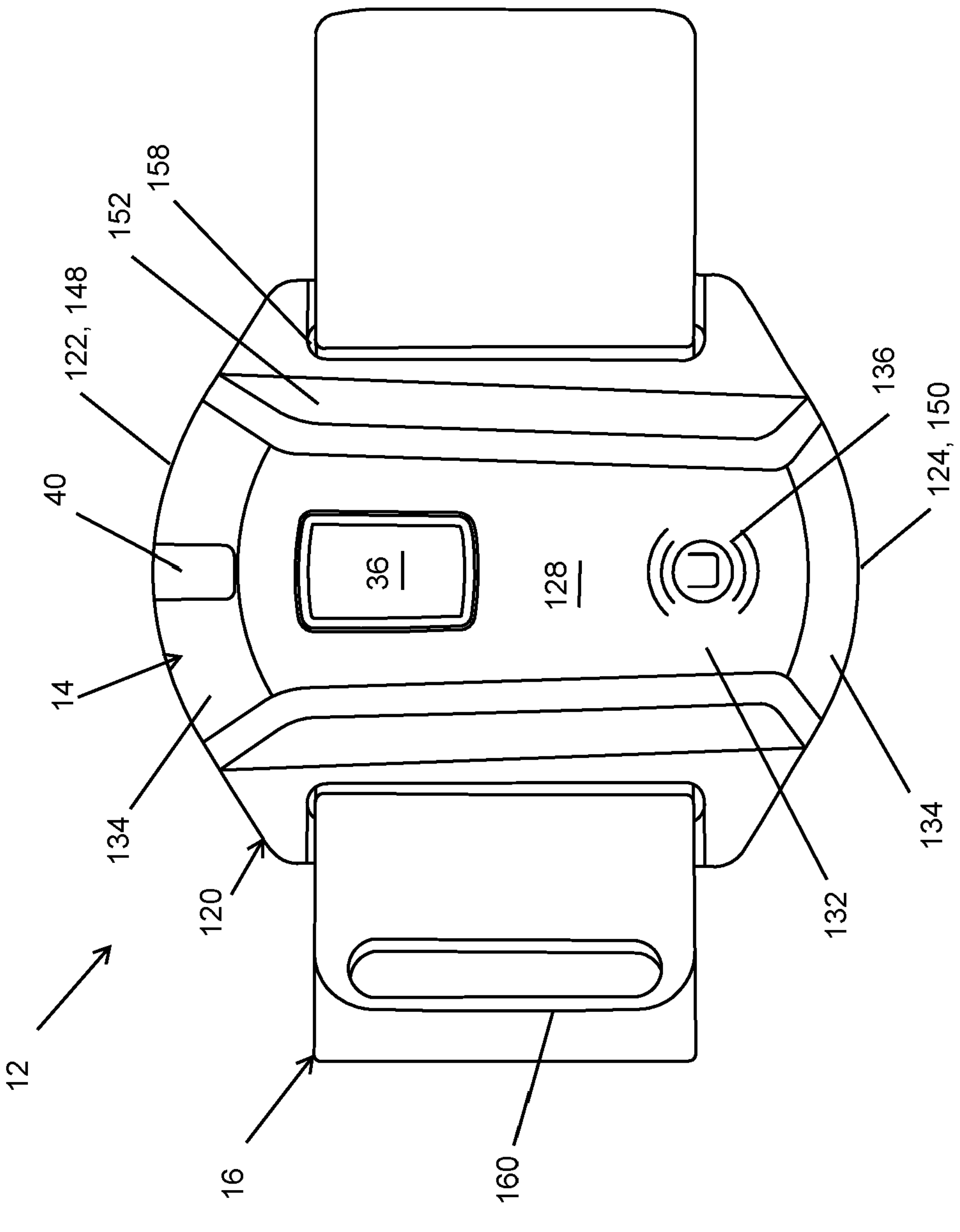
FIG. 8 is an elevation view of the front side of the system shown in FIGS. 5 through 7, the view showing the core fully inserted within the opening of the holster.
Figure 9:
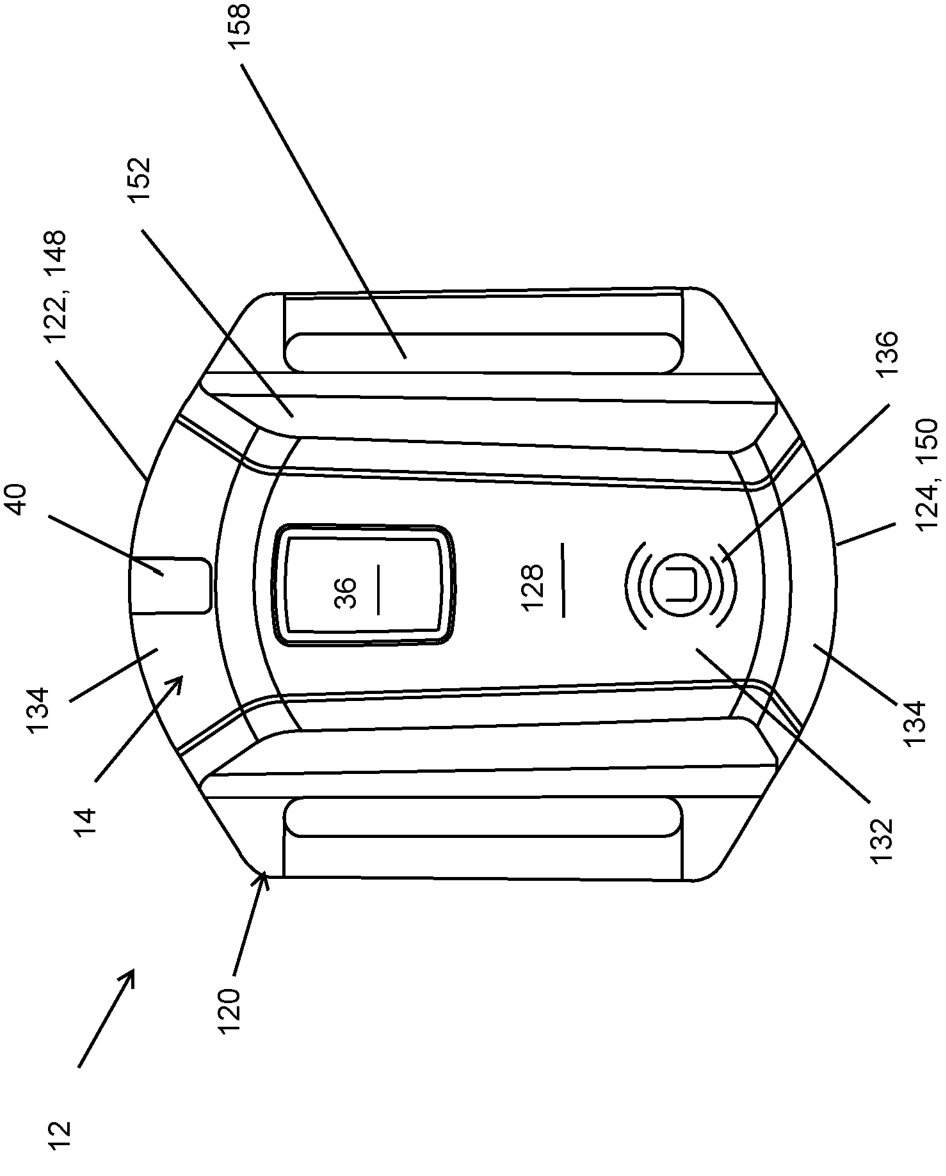
FIG. 9 is an elevation view of the front side of the system shown in FIGS. 5 through 8, the view showing the core fully inserted within the opening of the holster; the view showing the band removed.
Figure 9A:
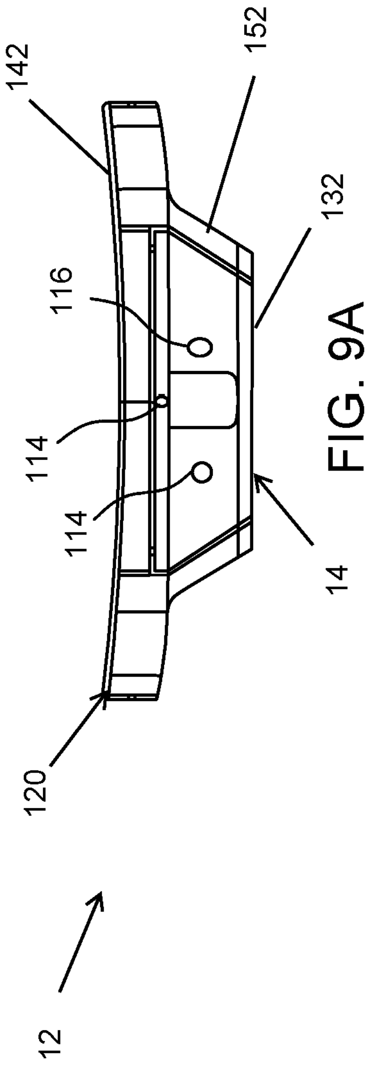
Figure 9B:
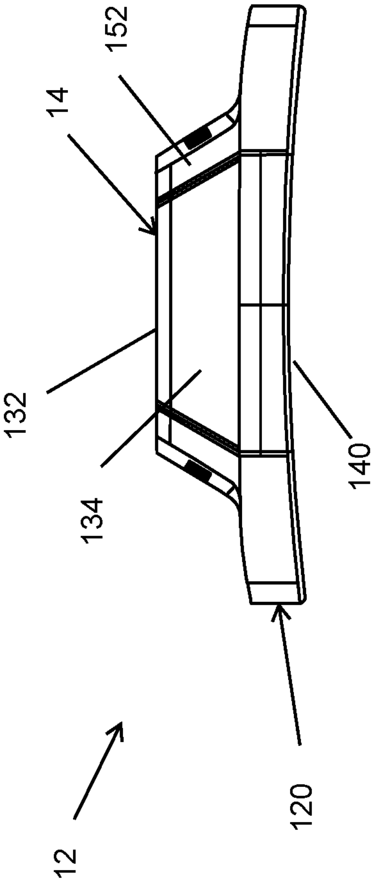
FIG. 9B is an elevation view of the bottom side of the system shown in FIGS. 5 through 9, the view showing the core fully inserted within the opening of the holster; the view showing the band removed.
Figure 9D:
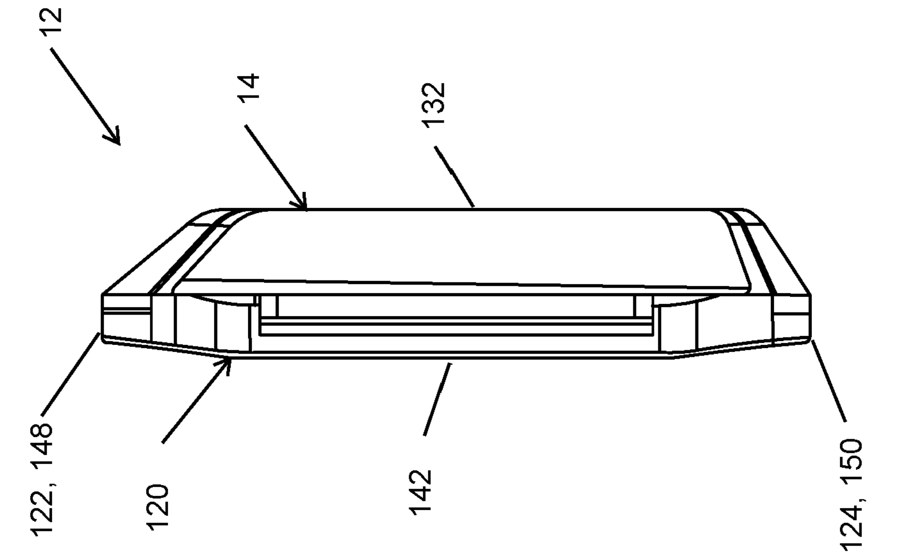
FIG. 9D is an elevation view of the right side of the system shown in FIGS. 5 through 9, the view showing the core fully inserted within the opening of the holster; the view showing the band removed.
Figure 9C:
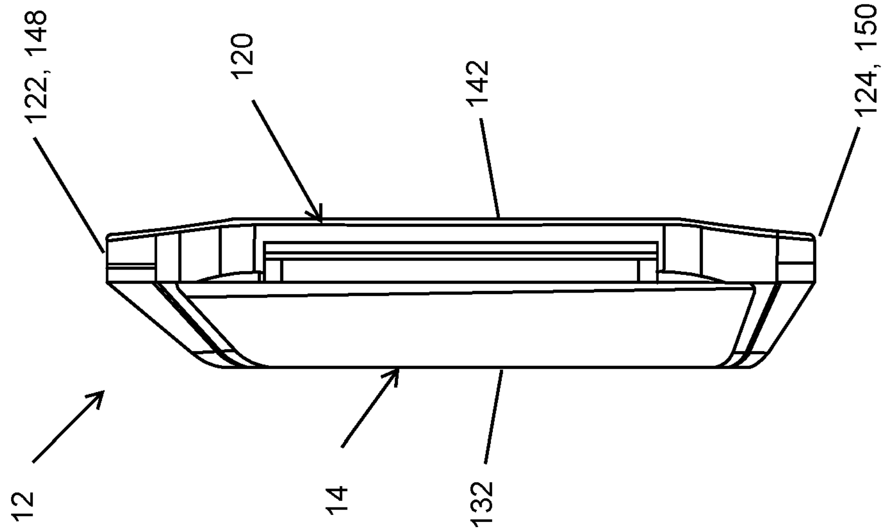
FIG. 9C is an elevation view of the left side of the system shown in FIGS. 5 through 9, the view showing the core fully inserted within the opening of the holster; the view showing the band removed.
Figure 10:
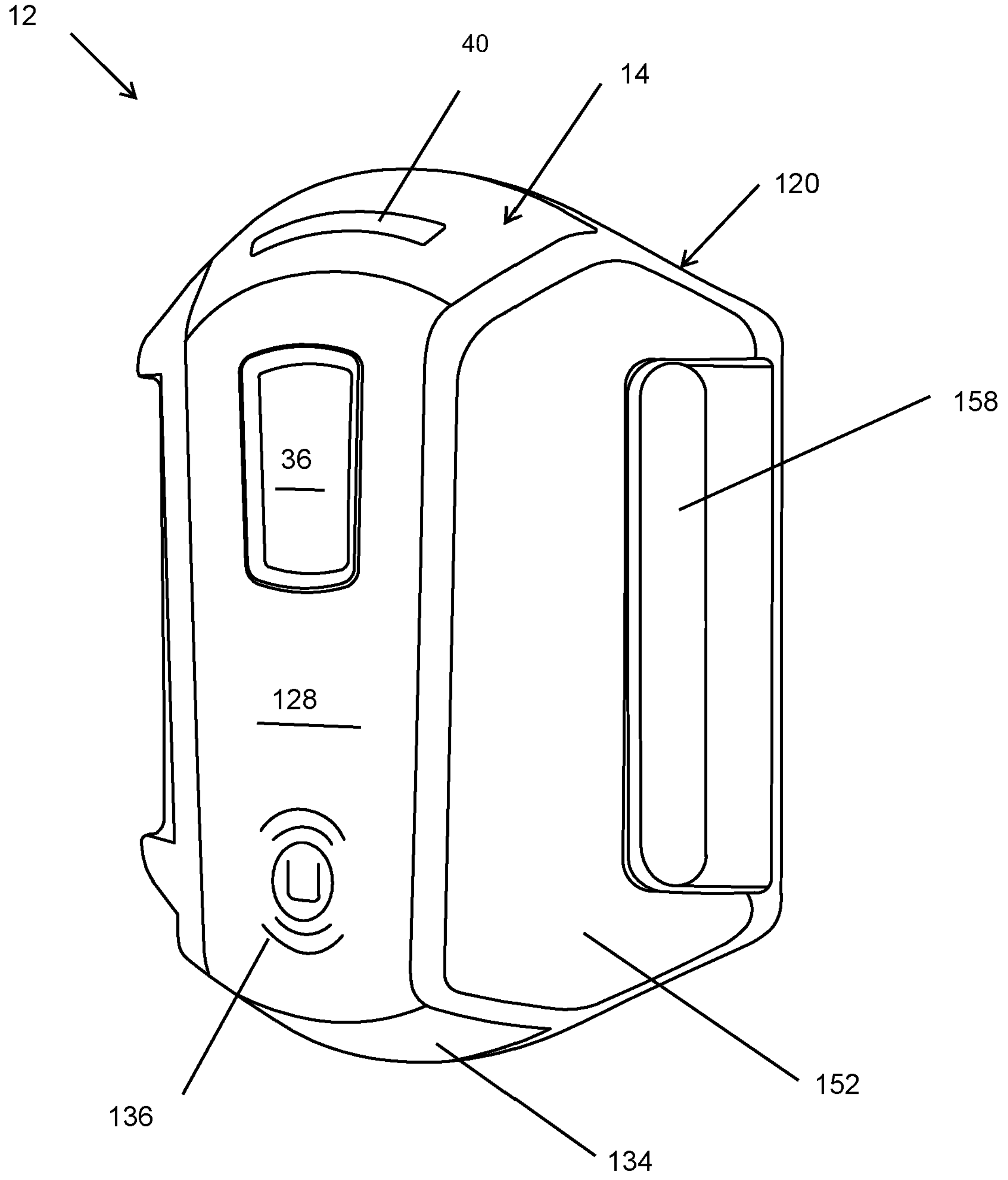
FIG. 10 is another perspective view of the system shown in FIGS. 5 through 9, the view showing the core fully inserted within the opening of the holster; the view showing the band removed.
Figure 11:
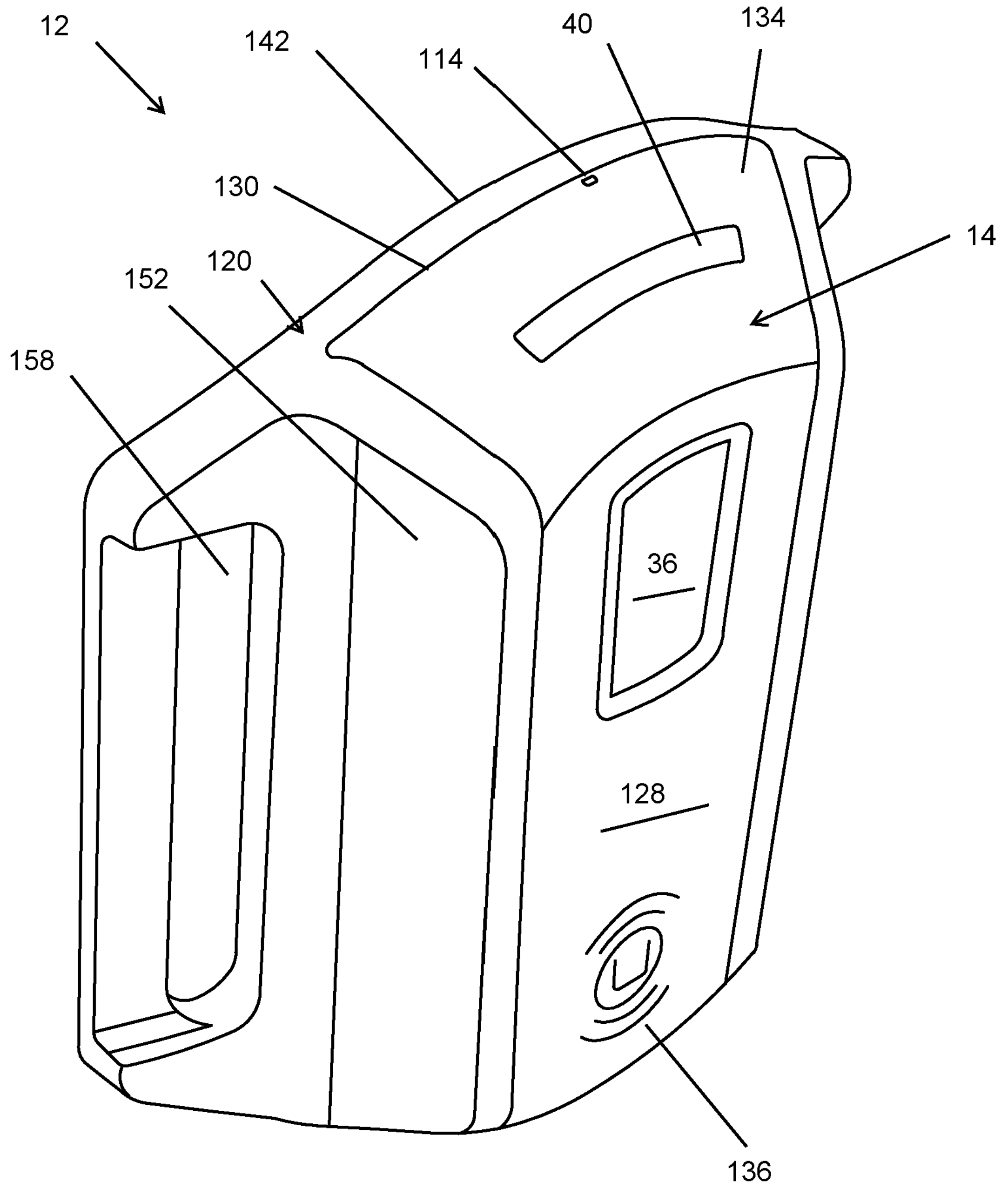
FIG. 11 is another perspective view of the system shown in FIGS. 5 through 10, the view showing the core fully inserted within the opening of the holster; the view showing the band removed.
Figure 12:
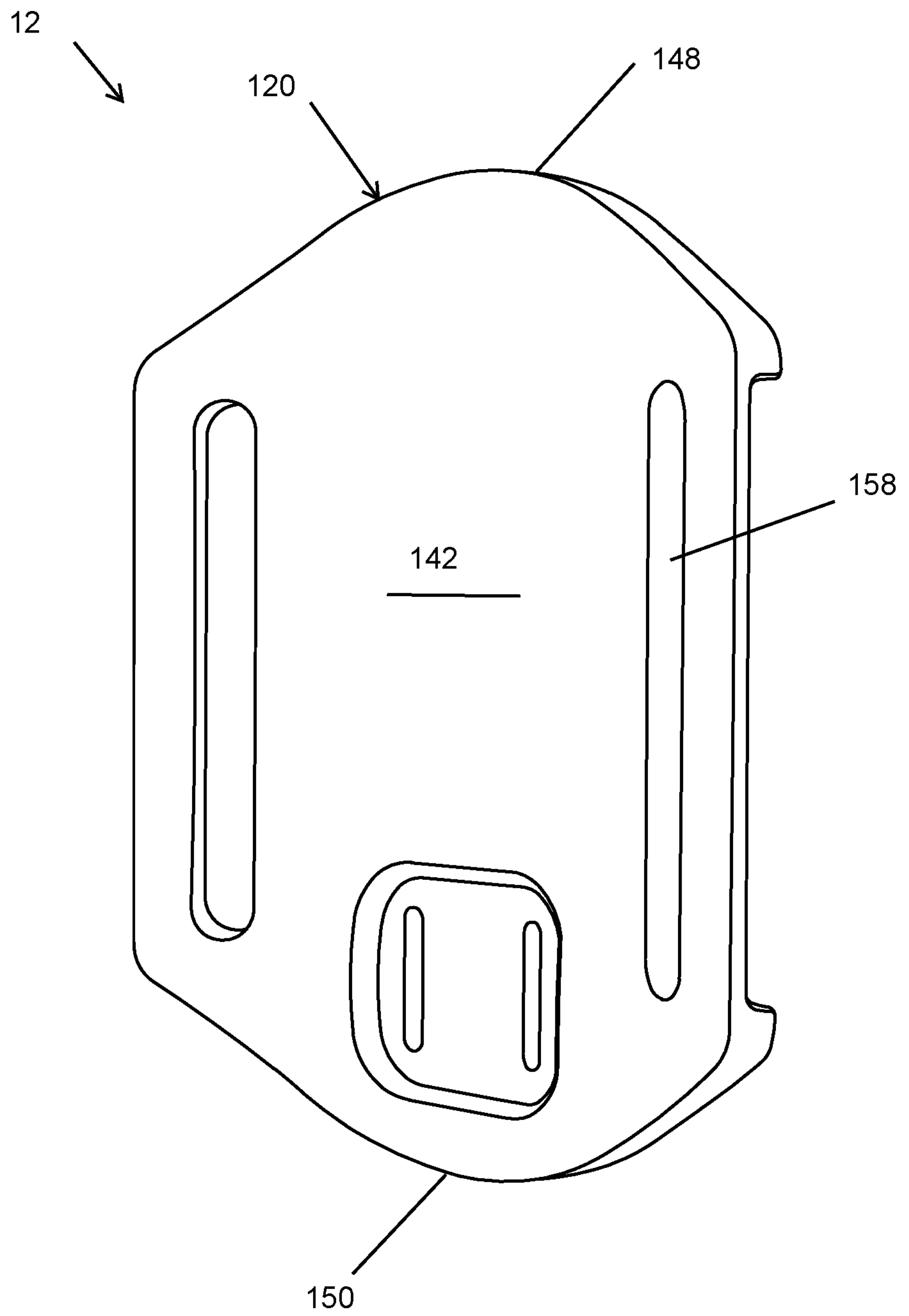
FIG. 12 is another perspective view of the system shown in FIGS. 5 through 11, the view showing the core fully inserted within the opening of the holster; the view showing the band removed; the view showing the back side of the holster.
Figure 13:
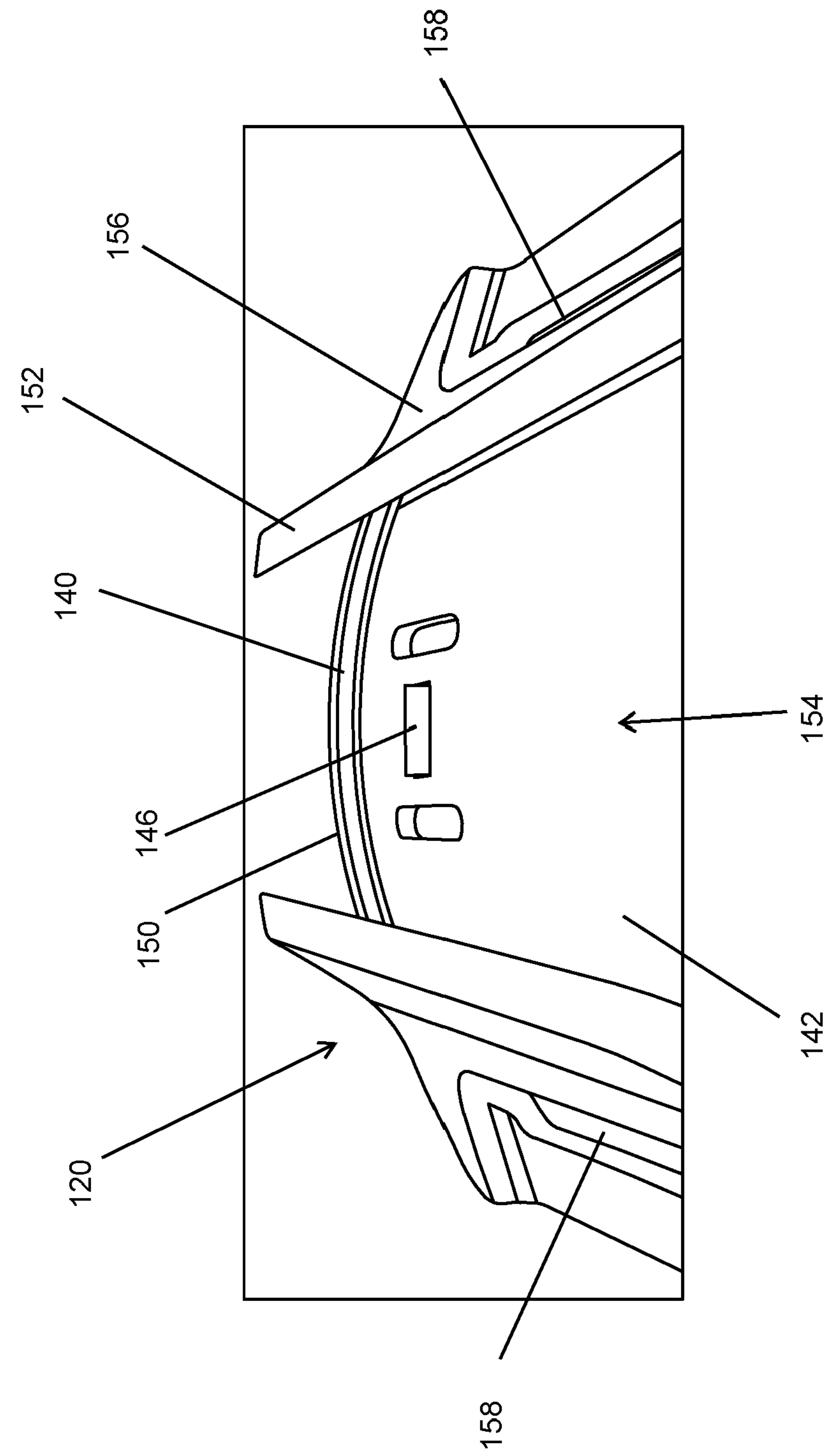
FIG. 13 is a partial perspective view of the holster of the system, the view showing the opening in the holster between opposing sidewalls and the back wall that is sized and shaped to receive the core therein; the view also showing the detent mechanism in the back wall that is configured to engage the core and hold the core within the opening of the holster; the view also showing the step positioned in the lower end of the back wall between the sidewalls that is configured to engage the lower end of the core and prevent the core from sliding out the lower end of the opening.
Figure 14:
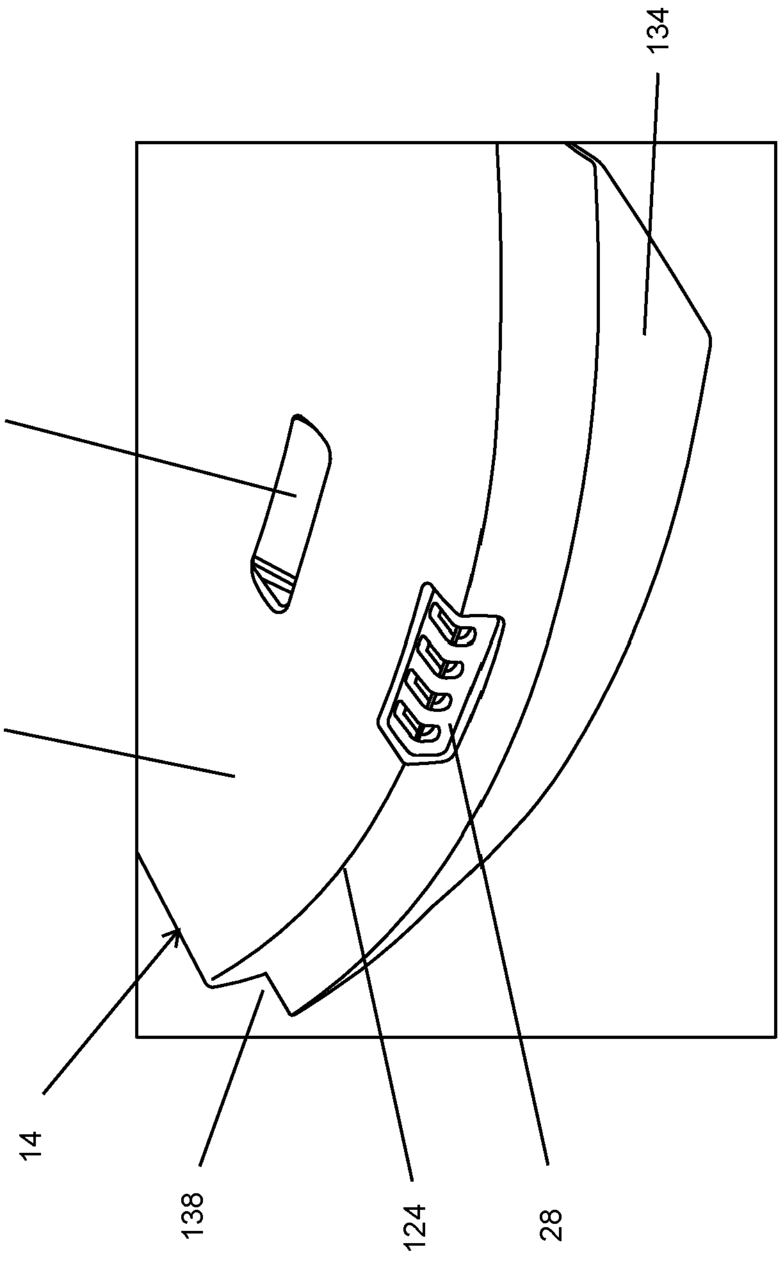
FIG. 14 is a partial perspective view of the back side of the lower end of the core, the view showing the detent mechanism in the back wall that is configured to engage the detent mechanism in the holster and hold the core within the opening of the holster; the view also showing the step positioned in the lower end of the back wall between the sidewalls that is configured to engage the lower end of the opening of the holster and prevent the core from sliding out the lower end of the opening; the view also showing the port with a plurality of connection pins positioned in the lower end of the back wall at the step, the port configured to provide charging capabilities as well as data transfer capabilities when plugged into the charging base or other components of the system.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of safety devices. However, the embodiments are not so limited. In is appreciated that the embodiments may be adapted for use in other applications which may be improved by the disclosed structures, arrangements and/or methods. The system is merely shown and described as being used in in the context of safety devices for ease of description and as one of countless examples.

System 10:

With reference to the figures, a safety device system 10 is presented (system 10). System 10 includes a plurality of safety devices 12. Safety devices 12 are formed of any suitable size, shape and design and are configured to record information that is pertinent to worker safety, such as environmental conditions as well as near misses.

In one or more arrangements, as is shown, safety device 12 includes a core 14. Core 14 is formed of any suitable size, shape and design and is configured to house, hold, and shelter the components of safety device 12.

In one or more arrangements, safety device 12 is configured to be worn by a worker 102 and in this way, safety device 12 is considered to be a wearable device. To facilitate being worn by a worker 102 while working, an attachment member 16 is connected to or formed into safety device 12 and/or core 14 of safety device 12. In one or more arrangements, as is shown, attachment member 16 is a band, strap, belt, elastic strap, or the like, that is attachable to a worker's arm wrist, waist or other part of the body or clothing worn by the worker 102. In one or more arrangements, it is desirable to attach the safety device 12 to the worker's non-dominant arm while working. Alternatively, attachment device 16 is formed of any other device that connects two components together such as a snap-fit member, a clip, hook-and-loop arrangement, a button, a snap, a zipper-mechanism, a zip-tie member, or the like, just to name a few. As another arrangement, safety device 12 can be attached to or formed as part of a piece of clothing or equipment, such as a safety vest, a helmet, or the like. In one or more arrangements, as is further described herein, core 14 of safety device 12 is held within a holster 120 in a removable manner and attachment member 16 is connected to holster 120, as is further described herein.

In one or more arrangements, as is shown, safety device 12 includes a plurality of electronic components that are configured to act in concert with one another carry out the purpose and function of safety device 12, which is to detect record and report information about the environmental conditions of a workplaces surrounding a worker 102 while working. In one or more arrangements, safety device 12 includes one or more microprocessors 18 and memory 20. Microprocessor 18 is any electronic device which receives inputs, such as signals or information, and processes it in accordance with instructions stored in memory 20. Memory 20 is any device which stores information and allows for retrieval of this information upon command. In one or more arrangements, microprocessor 18 may have its own onboard memory 20 and microprocessor 18 and memory 20 may be a single unitary and combined component. In another arrangement, memory 20 may be one or more standalone units that are electrically connected to microprocessor 18. In yet another arrangement, microprocessor 18 may have its own onboard memory 20 as well as being connected to memory 20 that is a standalone unit, or any combination thereof. As such, it is hereby contemplated that safety device 12 may include multiple microprocessors 18 (which may or may not have their own onboard memory 20) and/or multiple devices which serve as memory 20.

In one or more arrangements, safety device 12 includes a pair of microprocessors 18, with one microprocessor 18 primarily devoted to controlling the operation of recording the sound surrounding the worker 102, and the other microprocessor 18 devoted to controlling the other operations of the safety device 12.

In one or more arrangements, as is shown, safety device 12 includes an antenna 22 which is operatively connected to a receiver, transmitter, and/or a transceiver (hereinafter referred to as transceiver 24). Antenna 22 is any device which receives and/or transmits wireless signals. A receiver is any device that receives wireless signals from antenna 22, processes these signals and transmits them to microprocessor 18 or other electronic components. In this way, a receiver receives information from antenna 22. A transmitter is any device that receives signals from microprocessor 18, or other electronic components, processes these signals and transmits them through antenna 22 for over the air broadcasting. In this way, a transmitter transmits information through antenna 22. A transceiver is any device which is capable of operating as both a receiver and a transmitter. It is hereby contemplated that safety device 12 includes a receiver, or a transmitter or both a receiver and transmitter, which may be a single combined electronic device, separate devices, or a plurality of devices. Reference shall be made herein to "transceiver 24" for purposes of simplicity; however, reference to the term "transceiver" shall be understood to include a receiver alone, a transmitter alone, a receiver and a transmitter, a transceiver, or any combination thereof.

Transceiver 24 may be configured to communicate using any protocol such as 802.11/Wi-Fi, Wi-Max, Bluetooth, Bluetooth Low Energy, UltraWideband (UWB), ZigBee, Zwave, GSM/EDGE, UMTS/HSPA+/HSDPA, CDMA, LTE, and/or FM/VHF/UHF networks or any other communication medium and/or protocol. The use of a transceiver that facilitates two-way communication facilities the transmission of over-the-air updates to cores 14 from a central processor or command center which ensures that the software and/or firmware of the core 14 is always up to date.

In the arrangement shown, as one example, safety device 12 includes a power source 26 which is operatively connected to the electronic components of safety device 12 such that power source 26 provides power to these electronic components. Power source 26 is formed of any suitable size, shape, and design. In one or more arrangements, power source 26 is formed of one or more replaceable/disposable batteries. In another arrangement, power source 26 is formed of one or more rechargeable batteries.

In one or more arrangements, as is shown, safety device 12 includes a port 28 which is operatively connected to the electronic components of safety device 12. Port 28 is formed of any suitable size, shape and design and is configured to allow for the reception and transmission of information as well as charging of on board power source 26.

In one or more arrangements, as is shown, safety device 12 includes a plurality of sensors 30. Sensors 30 are formed of any suitable size, shape and design and are configured to sense environmental conditions surrounding the worker 102 while working. In one or more arrangements, safety device 12 includes a plurality of sensors 30.

In one or more arrangements, safety device 12 includes a sound sensor 30A. Sound sensor 30A is formed of any suitable size, shape and design and is configured to detect the volume level and/or frequency of sound surrounding the worker 102. In one or more arrangements, sound sensor 30A is a microphone that is accessible through one or more openings 114 in core 14 that provide unfettered access for the sound to reach the microphone. Sound sensor 30A allows for the detection of elevated sounds, abrupt spikes in sounds, loud noises, irritating or distracting frequencies or the like. Sound sensor 30A also allows for the detection of when a volume threshold is approached or exceeded.

In one or more arrangements, safety device 12 includes a temperature sensor 30B. Temperature sensor 30B is formed of any suitable size, shape and design and is configured to detect the temperature of the environment surrounding the worker 102. The same and/or an additional temperature sensor 30B may be configured to detect the temperature of the worker 102 themselves. In one or more arrangements, temperature sensor 30B is a thermometer. Temperature sensor 30B allows for the detection of high or low temperatures as well as abrupt changes in temperature. Temperature sensor 30B also allows for the detection of when a temperature threshold is approached or exceeded. In one or more arrangements, safety device 12 includes a humidity sensor 30C. Humidity sensor 30C is formed of any suitable size, shape and design and is configured to detect the humidity of the environment surrounding the worker 102. The same and/or an additional humidity sensor 30C may be configured to detect the humidity level, moisture level or perspiration level of the worker 102 themselves. Humidity sensor 30C allows for the detection of high or low levels of humidity as well as abrupt changes in humidity. Humidity sensor 30C also allows for the detection of when a humidity threshold is approached or exceeded. In one or more arrangements, safety device 12 includes a light sensor 30D. Light sensor 30D is formed of any suitable size, shape and design and is configured to detect the light levels of the environment surrounding the worker 102. Light sensor 30D allows for the detection of high or low levels of light as well as abrupt changes in light levels. Light sensor 30D also allows for the detection of when a light threshold is approached or exceeded. In one or more arrangements, light sensor is operably connected to and/or accessible by a light pipe 116. Light pipe 116 is any device that facilitates the collection and transmission of light from the environment surrounding the worker 102. In one or more arrangements, light pipe 116 is a clear, transparent, or translucent material that extends from the exterior of the core 14 to the light sensor 30D and therefore covers and protects light sensor 30D while enabling the sensing of light conditions.

In one or more arrangements, safety device 12 includes an air quality sensor 30E. Air quality sensor 30E is formed of any suitable size, shape and design and is configured to detect the air quality of the environment surrounding the worker 102, the particulate matter in the air of the environment surrounding the worker 102, the contaminant levels in the air of the environment surrounding the worker 102, or any particular contaminant level in the air surrounding the worker 102 (such as ammonia, chlorine, or any other chemical, compound or contaminant). Air quality sensor 30E allows for the detection of high contaminant levels in the air as well as abrupt changes in air quality. Air quality sensor 30E also allows for the detection of when an air quality threshold is approached or exceeded.

In one or more arrangements, air quality sensor 30E is a total volatile organic compound sensor, also known as a TVOC sensor. Volatile organic compounds (or VOCs) are organic chemicals that have a high vapor pressure at ordinary room temperature. VOCs are numerous, varied, and ubiquitous. They include both human-made and naturally occurring chemical compounds. Most scents or odors are of VOCs. In this arrangement, air quality sensor 30 is configured to detect VOCs. Also, in one or more arrangements, air quality sensor 30E is accessible through one or more openings 114 in core 14 that provide unfettered access and airflow for sensing by air quality sensor 30E.

In one or more arrangements, safety device 12 includes a carbon monoxide (CO) sensor 30F. CO sensor 30F is formed of any suitable size, shape and design and is configured to detect CO levels of the environment surrounding the worker 102. CO sensor 30F allows for the detection of high CO levels in the air as well as abrupt changes in CO levels. CO sensor 30F also allows for the detection of when a CO threshold is approached or exceeded. Of course, sensor 30F, or additional sensors 30, may be used to sense other gasses in the air around the worker 102, such as carbon dioxide, ozone, or any other gas or other content of the air around the worker 102. Also, in one or more arrangements, sensor 30F is accessible through one or more openings 114 in core 14 that provide unfettered access and airflow for sensing by sensor 30F.

In one or more arrangements, safety device 12 includes a position sensor 30G. Position sensor 30G is formed of any suitable size, shape and design and is configured to detect the position of the worker 102 within the manufacturing facility. Notably, the term manufacturing facility is to be construed in a broad manner and may include being within one or a plurality of buildings. However, the manufacturing facility may include being outside and unconstrained by the boundaries of a building or any particular grounds. Position sensor 30G allows for the detection of movement of the worker 102 within the manufacturing facility, the speed of movement of the worker 102 within the manufacturing facility, the tracking of the position of the worker 102 within the manufacturing facility, among any other speed, location, direction, inertia, acceleration, or position information. This position information can be aggregated over the course of the worker's shift to determine the amount of distance traveled by the worker 102, the average speed, the mean speed, the highest speed, or any other information. In addition, this position information can be aggregated to determine the areas where the worker 102 concentrated their time. In addition, this position information can be correlated with the information detected by the other sensors to determine the concentration of certain environmental factors in different areas of the manufacturing facility. Position sensor 30 may be a GPS device, a Wi-Fi device that utilizes triangulation from known points, a Wi-Fi device that utilizes trilateration from known points, or any other device that detects the position of safety device 12 and the worker 102.

In one or more arrangements, safety device 12 includes an accelerometer 32. Accelerometer 32 is formed of any suitable size, shape and design and is configured to detect acceleration and/or movement of the safety device 12, such as when a worker 102 trips on something on the floor and almost falls, or when a worker 102 falls off of a ladder, is hit by a fork truck, or has another traumatic event. Accelerometer 32 may be formed of any acceleration detecting device such as a one axis accelerometer, a two axis accelerometer, a three axis accelerometer, or the like. Accelerometer 32 also allows for the detection changes in acceleration, detection of changes in direction as well as elevated levels of acceleration.

In an alternative arrangement or in addition to an accelerometer 32, a gyroscope or gyro-sensor may be used to provide acceleration and/or movement information. Any form of a gyro is hereby contemplated for use, however in one or more arrangements a three-axis MEMS-based gyroscope, such as that used in many portable electronic devices such as tablets, smartphones, and smartwatches is contemplated for use. These devices provide 3-axis acceleration sensing ability for X, Y, and Z movement, and gyroscopes for measuring the extent and rate of rotation in space (roll, pitch, and yaw).

In another arrangement and/or in addition to an accelerometer 32, a magnetometer may be used to provide acceleration and/or movement information. Any form of a magnetometer that senses information based on magnetic fields is hereby contemplated for use. In one or more arrangements, a magnetometer is used to provide absolute angular measurements relative to the Earth's magnetic field. In one or more arrangements, an accelerometer, gyro and/or magnetometer are incorporated into a single component or a group of components that work in corresponding relation to one another to provide up to nine axes of sensing in a single integrated circuit providing inexpensive and widely available motion sensing.

Safety device 12 may also include any other sensors 30. For example, in one or more arrangements, safety device 12 includes one or more sensor 30 that tracks biometric data of the worker including but not limited to, for example, heart rate, blood pressure, blood oxygen levels, blood alcohol levels, blood glucose sensor, respiratory rate, galvanic skin response, bioelectrical impedance, brain waves, and/or combinations thereof.

During operation, sensors 30 detect environmental conditions, such as sound, temperature, humidity, light, air quality, CO levels, TVOC levels, particulate levels, position and acceleration information, direction information, speed information and the like respectively. This information is periodically and/or continuously transmitted to microprocessor 18 and/or stored in memory 20. This information is also periodically and/or continuously transmitted through transceiver 24 and antenna 22 and is communicated to and stored in a database 34 where it is aggregated and analyzed to detect patterns as is described further herein.

Safety device 12 includes an event trigger 36. Event trigger 36 is formed of any suitable size, shape and design and is configured to allow a worker 102 to indicate that a notable event just occurred, such as an accident that almost occurred (also known as a near miss), such as when the worker 102 trips and almost falls, when the worker 102 is almost struck by a forklift, when products almost fall on the worker 102, when the worker 102 is almost injured by a tool, or the like near misses.

Also, workers 102 are encouraged to use event trigger 36 when a notable event occurs. This may be any information that the worker 102 believes would be helpful for the safety manager 112 to know about or others in the management of the manufacturing facility. This may include a suggestion as to how to improve the manufacturing facility, problems associated with the layout of the manufacturing facility, the worker 102 noticing that equipment is wearing and likely to fail in the near future, that ear plugs, safety glasses or other protective equipment is failing, that a door fails to lock, that another employee is behaving strangely or taking unnecessary risks, or practically any other information. It has been tested that providing the worker 102 with the instantaneous ability to record suggestions or information at the moment the information dawns on the worker 102, reduces the barriers to providing this information and as such, this information is more-readily provided as it is very easy to provide. In addition, because the information is provided contemporaneous with the worker 102 experiencing the notable event, it has been found that the information is provided in a thorough, unbiased, honest, and straight forward manner. Or said, another way, when a worker 102 waits to report improvements or issues at the end of the shift, the worker 102 is likely to be uninclined to go through the reporting process, they are likely to forget salient details, or their memory of events could fade. In contrast, by providing an easy and contemporaneous recordation of the notable event at or just after the time the event occurs, the information provided tends to be pure and uncorrupted. Due to the ease of simply pressing the event trigger 36 the worker 102 is likely to report the information. More accurate reporting and more frequent reporting allows a safety manager 112 or management in general to be more aware of the issues in the manufacturing facility and able to continuously improve the manufacturing facility. In addition, the timeliness of this information cannot be matched as it is transmitted to the safety manager 112 and/or database 34 as soon as it is recorded and as soon as the safety device 12 establishes connectivity with database 34 and/or charging base 118 or another wireless communication intermediary, such as a repeater.

In one or more arrangements, event trigger 36 is a button, switch or other device placed on or formed in safety device 12 that allows the worker 102 to indicate that a notable event (such as a near miss) just occurred. At the time the event trigger 36 is activated, the safety device 12 records and/or transmits and/or saves a higher level or high-density of environmental information such as sound, temperature, humidity, light, air quality, CO levels, position, acceleration and the like and transmits this information to database 34. This high-density environmental information is stored along with an audible message provided by the worker 102 explaining why they engaged the event trigger 36. In one or more arrangements, the safety device 12 continually tracks and stores a predetermined amount of high-density data, such as sixty-seconds two minutes, thirty seconds, or the like. This high-density data is tracked and stored in a rolling manner. That is, the high-density data is overwritten or converted to low-density data unless an event occurs that causes the safety device 12 to save and transmit the high-density data.

As one example, when event trigger 36 is activated, the safety device 12 stores this high-density information for transmission through port 28 when safety device 12 is connected to charging base 118, or the safety device 12 transmits this information wirelessly over the air through antenna 22 when wireless connectivity is established with charging base 118 and/or database 34. When event trigger 36 is not activated, safety device 12 stores and/or transmits a lower level or low-density of information, or overwrites a portion of the high-density information. That is, by way of example, high-density information may include storing and/or transmitting a sample from sensors 30 once every hundredth of a second or tenth of a second, whereas low-density information may include storing and transmitting a sample from sensors once every second or once every two seconds, or the like. In this way, a balance can be had between recording a high sensitivity of information at and just prior to the time an accident, near miss or notable event occurs, while recording enough information to develop patterns and predict potential accidents while not being overly encumbered by too much data when an accident, near miss or notable event situation has not occurred.

In one or more arrangements, when event trigger 36 is activated, the sound sensor 30A, or microphone, is activated for a predetermined time or period thereafter. This allows the worker 102 to voice record the events of the accident, near miss or notable event contemporaneously, or just after, the event occurs. This allows for an honest and relatively unbiased account of the event shortly after the near miss occurs. This voice recording can be converted into text and automatically inserted into an event report, or alternatively the voice recording itself may be inserted directly into an event report. In one or more arrangements, the audio recording through sound sensor 30A occurs for a predetermined amount of time such as for thirty seconds or a minute after the event trigger 36 is pressed. In another arrangement, the audio recording through sound sensor 30A occurs for so long as the safety device 12 detects that the worker 102 is talking. In another arrangement, the audio recording through sound sensor 30A occurs for so long as the worker 102 depresses or engages the event trigger 36. In another arrangement, sound sensor 30 records the audio for a length of time or period determined by any other manner, method or means.

In one or more arrangements, to eliminate or reduce unintentional engagement of the event recording function of safety device 12, safety device 12 is configured to require a special engagement or unlock procedure to start the event recording function. In one or more arrangements, a double engagement or double press of event trigger 36 is required to engage the event recording function. In another arrangement, an elongated press of event trigger 36 is required to engage the event recording function.

In yet another arrangement, an accident or near miss or other safety matter can be distinguished from a notable event (such as a suggestion for improvement of a process or the factory layout by a worker 102) by the manner in which the event trigger 36 engaged. As one example, a safety issue is reported by pressing the event trigger 36 twice and a notable event that is not related to immediate safety concerns is reported by pressing the event trigger 36 three times. Alternatively, two different triggers 36, such as two buttons, can be provided one dedicated for safety issues the other dedicated for non-safety issues. Or any other manner of reporting safety issues and non-safety issues may be used. By separating the reporting of safety issues from non-safety issues, this allows reports of safety issues, accidents and near misses to be expedited through the system 10, such as immediately emailing or texting them to a safety manager 112 or other manager so that they can respond quickly to safety issues while allowing non-safety issues to be handled as a lower priority. In one or more arrangements, the report of safety issues is instantaneously reported over the air to charging base 118 and/or database 34 and is thereafter contemporaneously, immediately, and/or quickly sent to a safety manager's phone, email, text message or the like for their immediate attention. In contrast, non-safety related matters are stored on safety device 12 and downloaded once core 14 is installed in charging base 118. In this way, the system 10 includes an expedited path for the report of notable events that are safety issues and the system 10 includes a non-expedited path for the report of notable events that are not safety issues.

In one or more arrangements, safety device 12 includes one or more audible indicators 38. Audible indicator 38 is formed of any suitable size, shape and design and is configured to provide an audible indication to the worker 102 when a hazard condition may be present or when a safety threshold is approached or exceeded or when any other event or issue occurs that the worker 102 should be informed of. In one or more arrangements, audible indicator 38 is a speaker, or any other device that is configured to produce or repeat a sound, such as a tone, an alarm, audible instructions, or any other sound.

As an example, when the decibel level in the environment surrounding the worker 102 reaches 90% of the safety threshold sound, as is sensed by sound sensor 30A, the microprocessor 18 detects that a safety threshold is approached and issues an alarm or a prerecorded spoken voice instruction or any other audible indication through audible indicator 38, which informs the worker 102 to retreat from the potentially unsafe condition. Audible indicator 38 may also be used to provide any instructions to the worker 102, such as telling them through a voice command to join a mandatory meeting in the lobby, informing them of a fire alarm or contaminant alarm, providing them with their schedule for the day, providing them with the goals for the day, providing them with instructions for the day, or providing information on any other condition or instruction.

In one or more arrangements, safety device 12 includes one or more visual indicators 40. Visual indicator 40 is formed of any suitable size, shape and design and is configured to provide a visual indication to the worker 102 when a hazard condition may be present or when a safety threshold is approached or exceeded or when any other event or issue occurs that the worker 102 should be informed of. In one or more arrangements, visual indicator 40 is one or more lights, LEDs or any other illuminating device placed in core 14 which illuminates. In one or more arrangements, visual indicator 40 is formed of a red, a green and a blue LED which illuminate in various ways to provide various information. However any other number of lights or LEDs are hereby contemplated for use as is any other color of lights or LEDs.

As an example, when the air quality in the environment surrounding the worker 102 reaches a first safety threshold as is detected by the microprocessor 18 though air quality sensor 30E (e.g. exceeds 80% of a safety threshold) a first light of the visual indicator 40 is illuminated, such as the blue LED; when the air quality in the environment surrounding the worker 102 reaches a second safety threshold as is detected by the microprocessor 18 though air quality sensor 30E (e.g. exceeds 90% of a safety threshold) a second light of the visual indicator 40 is illuminated, such as the green LED, or both the green and the blue LED are illuminated; when the air quality in the environment surrounding the worker 102 reaches a third safety threshold as is detected by the microprocessor 18 though air quality sensor 30E (e.g. reaches or exceeds 100% of a safety threshold) a third light of the visual indicator 40 is illuminated, such as the red LED, or the green, blue and red LEDs are illuminated. Illumination of visual indicators 40 informs the worker 102 to retreat from the potentially unsafe condition or location.

In another arrangement, various visual indicators 40 may be used to provide information regarding the state of operation of safety device 12. As an example, one light of the visual indicators 40 of the safety device 12 may be illuminated when the safety device 12 is powered and operational, such as illumination of a blue LED. As another example, one light of the visual indicators 40 of the safety device 12 may be illuminated when the power source 26 of safety device 12 reaches a power or charge threshold as is sensed by microprocessor 18, such as falling below a 10% charge level and as such illumination of this visual indicator 40 informs the worker 102 it is time to charge the safety device 12. As another example, one light of the visual indicators 40 of the safety device 12 may be illuminated when the safety device 12 is wirelessly connected to the internet, a hub, or other communication device.

In one or more arrangements, safety device 12 includes one or more physical indicators 42. Physical indicator 42 is formed of any suitable size, shape and design and is configured to provide a physical indication to the worker 102 when a hazard condition may be present or when a safety threshold is approached or exceeded or when any other event or issue occurs that the worker 102 should be informed of. In one or more arrangements, physical indicator 42 is a vibration device placed in core 14 which vibrates upon command. As an example, when the air quality in the environment surrounding the worker 102 reaches a first safety threshold as is detected by the microprocessor 18 though air quality sensor 30E (e.g. exceeds 90% of a safety threshold) physical indicator 42 activates. Upon sensing this vibration or physical indication from physical indicator 42, the worker 102 retreats from the potentially unsafe condition.

Any other form of indicator is hereby contemplated for use with safety device 12 and is used to provide information to the worker 102. As an example, in one or more arrangements, core 14 may connect to a worker's headphones or other listening device (such as an earbud) through port 28, or wirelessly through wireless pairing, and when information becomes available, such as an announcement or reaching or exceeding a safety threshold, the safety device 12 transmits an audible signal to the worker's headphones or listening device. In this way, by connecting, either through a wired connection or wirelessly to the worker's headphones or other listening device the safety device 12 provides audible information directly to the worker 102 thereby eliminating or reducing the possibility that the worker 102 does not hear the information due to the noisy environment.

Safety device 12 includes an ID 44. ID 44 is any form of a unique identifier that identifies any one particular safety device 12 from other safety devices 12 used within a manufacturing facility. In one or more arrangements, ID 44 is a code that can be scanned, such as a bar code, QR code or other code. In another arrangement, ID 44 is a unique identifier that is contained within a near field communication (NFC) chip or other communication device. In another arrangement, ID 44 is a serial number. Any other form of identification is hereby contemplated for use as ID 44.

In Operation:

As one example, system 10 is used in a manufacturing facility 100 having a plurality of workers 102 and an electronic network 104. System 10 includes a user interface 106 connected to the electronic network 104 and database 34, which is operated and controlled by management software 108. A plurality of safety devices 12, one for each worker 102 are used to track near misses and reduce workplace accidents in the following manner.

At the beginning of a shift, workers 102 are assigned a safety device 12. The unique ID 44 of the safety device 12 is associated with the particular worker 102 by entering the ID 44 into database 34 by any means such as scanning, NFC, typing, biometric scanning, random allocation, or the like. In this assignment, the particular worker 102 is assigned to the particular core 14 and specific rules or guidelines are associated with the core 14 for use with that particular worker 102. As an example, safety thresholds for a worker 102 that works with loud pressing machines and wears external ear muffs may be much higher than a worker 102 that works in shipping and receiving and does not use any hearing protection. In this way, by assigning particular rules for each worker 102 based on that worker's job and tasks, allows the system 10 to provide more accurate information and determine more accurately when safety issues arise for that particular worker 102 because what may be acceptable for one worker's role may not be acceptable for another worker's role.

Once the core 14 is assigned to the worker 102, the worker 102 attaches safety device 12 to themselves, such as placing an elastic strap of attachment member 16 around the worker's non-dominant arm and tightening it by a buckle, Velcro, buttons or any other manner or method. Alternatively, safety device 12 is attached to their helmet, belt, pocket, collar, shirt, or to any other portion of their body or clothing or equipment by any manner or means.

Once attached, the safety device 12 is activated. Upon activation, safety device 12 establishes a wireless connection to database 34 through electronic network 104 and begins sending and receiving pertinent information. Also once activated, safety device 12 begins sensing environmental conditions surrounding the worker 102 through sensors 30.

As an example, where safety device 12 includes a sound sensor 30A, a temperature sensor 30B, a humidity sensor 30C, a light sensor 30D, an air quality sensor 30E, a CO sensor 30*f*, a position sensor 30G and an accelerometer 32, the safety device 12 periodically senses sound, temperature, humidity, light, air quality, CO levels, position and acceleration.

These environmental conditions are sensed and at least temporarily recorded or buffered in high-density (such as one sample every tenth of a second or every hundredth of a second, or the like, or in the example of sound, the sound in the environment is continuously recorded for a predetermined amount of time or period) to onboard memory 20 and/or transmitted through transceiver 24 and antenna 22 through electronic network 104 to database 34.

If an accident or a near miss occurs or a notable event occurs, this high-density of information is retained and stored on database 34 for later analysis. Buffering or retaining a high-density of information allows for an in-depth analysis of the conditions around the time of an accident or near miss. This high-density of information is retained around the time of an accident or near miss as it may shed additional light on the events surrounding the accident or near miss that may not be discernable if only low-density information is retained.

If on the other hand, an accident or near miss is not recorded, this high-density of information is overwritten, or not retained, and instead a low-density of information (such as one sample every half second or every second) is recorded, stored, and/or transmitted. Recording and/or transmitting a low-density of information continuously throughout the worker's shift allows for analysis and recordation of environmental information at an appropriate level of detail, while not being overly cumbersome and cumulative and overburdening the system 10 with too much unnecessary information at too high a level of detail.

In one or more arrangements, safety device 12 periodically transmits environmental information to database 34 through a wireless connection over electronic network 104 (such as when safety device 12 acquires a Wi-Fi connection). In an alternative arrangement, safety device 12 stores environmental information sensed by sensors 30 on onboard memory 20 throughout the worker's shift. Then, at the end of the shift, when safety device 12 is physically plugged into electronic network 104 by port 28 the information stored on memory 20 is downloaded to database 34. Also, while plugged in by port 28, the power source 26 is recharged.

Proximity Sensor:

In one or more arrangements, to ensure the purity of data collected, core 14 includes a proximity sensor or cover-sensor as one of the sensors 30. Proximity sensor is configured to determine when the core 14 is covered, such as when a worker puts a welding jacket on over the core 14, and when it is covered the core 14 takes corrective action, such as shutting down particular sensors, going into a sleep mode and/or filtering out what environmental data (such as light levels, sound levels or air quality as these would be effected by being covered) should not be recorded or reported due to be being covered.

Tripping Example

As an example, during the worker's shift, safety device 12 continuously senses the environmental conditions around the worker 102 using sensors 30, including the position of the worker 102 within the manufacturing facility, as well as recording the sound around the worker 102. The safety device 12 temporarily stores this information in high-density on the memory 20 of the safety device 12. Unless a notable event, near miss or accident occurs, this high-density of information is overwritten and only a low-density of information is retained on memory 20. This recordation of high-density information and then overwriting the information while only retaining a low-density of information is repeated until, during the worker's shift the worker 102 trips on a pallet that was improperly placed in a high traffic area. Upon tripping on this pallet, the accelerometer 32 senses the unusual acceleration and microprocessor 18 identifies this spike in acceleration as a potential accident or near miss (e.g. the system 10 is configured to apply machine learning and artificial intelligence to determine what are known as "signatures" that indicate a near miss or accident occurred, over time and with the application of more examples and more data, the system 10 becomes smarter and better able to distinguish when an accident or near miss occurs and separates these events from non-events). Microprocessor 18 interprets the information supplied to it through sensors 30 by the instructions stored in memory 20 and is programmed to identify the large spike in acceleration or "tripping signature" as a potential accident or near miss. Upon identifying this tripping incident as a possible accident or near miss, the microprocessor 18 retains the high-density of information for a predetermined amount of time both before and after the accident or near miss (such as 60 seconds before and 60 seconds after or the like).

In one or more arrangements, in response to sensing this accident or near miss, microprocessor 18 prompts worker 102 to provide a recitation or description of the accident or near miss through an audible indication using audible indicator 38, visual indication using visual indicator 40, a physical indication using physical indicator 42 or any combination of these indicators 38, 40, 42. In one or more arrangements, the audible indication is an audible tone, such as a beep or series of beeps, or audible instructions such as "A potential accident was detected, please describe what happened." In response, the worker 102 is trained to describe what occurred, which gives the worker 102 an opportunity to contemporaneously describe the events. This eliminates the potential that the worker 102 forgets what happened or confuses what happened in this event with another event.

In an alternative arrangement, the worker 102 is trained to press or engage the event trigger 36 when they experience a near miss or accident. Once the worker 102 presses or engage the event trigger 36 the worker is also trained to speak into the safety device 12 and describe the events that just occurred, or alternatively once the event trigger 36 is pressed or engaged the safety device 12 prompts the worker 102 to provide a description of the events that just occurred.

In one or more arrangements, upon sensing this accident or near miss, safety device 12 transmits a signal through a wireless connection to electronic network 104 that an accident or near miss just occurred. This signal indicates who the worker 102 is that experienced the accident or near miss through association of the unique ID 44 of safety device 12 to that worker 102, the position of the accident or near miss as is detected by position sensor 30G, as well as the nature of the accident or near miss, which in this example is a potential trip or fall, as is sensed by accelerometer 32. Any other sensed information may also be provided safety device 12. In one or more arrangements, the audible recording of the worker's description of the accident or near miss is also transmitted, or this audible recitation is automatically converted to text which is transmitted in text form as part of this signal.

As this event is considered an accident or near miss it receives expedited attention. Safety device 12 transmits some or all of the information related to the incident over the air to charging base 118, management software 108, electronic network 104 or any other communication path or communication device or system that is used in association with the system 10.

Once this signal is received by the system 10, database 34, charging base 118, and/or management software 108, the information is converted into an incident report and a signal, such as a text message, email, or the like is transmitted to an electronic device 110 (such as a cell phone, a handheld device, their own safety device 12, an email account, or any other electronic device capable of receiving an electronic message or information) of one or more safety managers 112 or other managers or other persons in charge of managing safety in the manufacturing facility 100. This signal includes the position/location of the event, time of the event, name of the employee involved and type of potential accident or near miss along with any other pertinent information. In one or more arrangements, the audible recording of the worker's description of the accident or near miss is also transmitted, or this audible recitation is automatically converted to text which is transmitted in text form as part of this signal. With this timely information, the safety manager 112 can quickly and effectively respond to the potential accident or near miss. This information is also stored as an incident report in database 34 for data mining, data retrieval, heat mapping, machine learning and artificial intelligence purposes.

As this event is a safety event, transmission is expedited through the system 10 so that the safety manager 112, a response team or others can quickly respond in attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage.

Once the safety manager 112 arrives at the scene of the accident or near miss they will see that a pallet was placed in a high traffic area. In response, the safety manager 112 can move the pallet or cordon off the area to prevent future accidents and/or take further corrective actions.

Falling Items Example

As an example, during the worker's shift, safety device 12 continuously senses the environmental conditions around the worker 102 using sensors 30, including the position of the worker 102 within the manufacturing facility, as well as recording the sound around the worker 102. The safety device 12 temporarily stores this information in high-density on the memory 20 of the safety device 12. Unless a notable event, near miss or accident occurs, this high-density of information is overwritten and only a low-density of information is retained on memory 20. This recordation of high-density information and then overwriting the information while only retaining a low-density of information is repeated until, during the worker's shift the worker 102 experiences falling items. As an example, during the worker's shift, the worker 102 climbs up on a ladder to remove some items from a shelf. Upon doing so, a number of items fall and almost strike the worker 102 in the head because they were improperly stacked or stored.

In response to this near miss, the worker 102 presses the event trigger 36. In response to the event trigger 36 being activated, microprocessor 18 retains the high-density of information for a predetermined amount of time both before and after the accident or near miss (such as 60 seconds before and 60 seconds after, or the like).

In one or more arrangements, in response to the event trigger 36 being activated, microprocessor 18 prompts worker 102 to provide a recitation or description of the accident or near miss through an audible indication using audible indicator 38 or a visual indication using visual indicator 40 or a physical indicator using physical indicator 42. In one or more arrangements, the audible indication is an audible tone, such as a beep or series of beeps, or audible instructions such as "A potential accident was detected, please describe what happened." In response, the worker 102 is trained to describe what occurred, which gives the worker 102 an opportunity to contemporaneously describe the events. This eliminates the potential that the worker 102 forgets what happened or confuses what happened in this event with another event.

In one or more arrangements, when the event trigger 36 is activated, indicating that an accident or near miss occurred, safety device 12 transmits a signal through a wireless connection to electronic network 104 that an accident or near miss occurred. This signal indicates who the worker 102 is that experienced the accident or near miss through association of the unique ID 44 of safety device 12, and the position and time of the accident or near miss as is detected by position sensor 30G, as well as the nature of the accident or near miss, which in this example is an activation of the event trigger 36. In one or more arrangements, the audible recording of the worker's description of the accident or near miss is also transmitted, or this audible recitation is automatically converted to text which is transmitted in text form as part of this signal.

Once this signal is received by the system 10, database 34, charging base 118, and/or management software 108, the information is converted into an incident report and a signal, such as a text message, email, or the like is transmitted to an electronic device 110 (such as a cell phone, a handheld device, their own safety device 12, an email account, or any other electronic device capable of receiving an electronic message or information) of one or more safety managers 112 or other managers or other persons in charge of managing safety in the manufacturing facility 100. This signal includes the position/location of the event, time of the event, name of the employee involved and type of potential accident or near miss along with any other pertinent information. In one or more arrangements, the audible recording of the worker's description of the accident or near miss is also transmitted, or this audible recitation is automatically converted to text which is transmitted in text form as part of this signal. With this timely information, the safety manager 112 can quickly and effectively respond to the potential accident or near miss. This information is also stored as an incident report in database 34 for data mining, data retrieval, heat mapping, machine learning and artificial intelligence purposes.

As this event is a safety event, transmission is expedited through the system 10 so that the safety manager 112, a response team or others can quickly respond in attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage.

Once the safety manager 112 arrives at the scene of the accident or near miss they will see that items were stored in the shelving in an unsafe and unstable manner. In response, the safety manager 112 removes the items or cordon off the area to prevent future accidents and/or the safety manager 112 takes further precautionary measures.

Notable Event Example:

As one example, a worker 102 during their shift realizes that they have a suggestion to improve a manufacturing step, to improve a workstation or improve the flow of the manufacturing facility, or any other suggestion or improvement. Without the safety device system 10, the worker 102 would have to walk to the location of either a safety manager 112, facility manager or other manager(s) office and meet with that person to describe their suggestion. This requires the worker to remove themselves from their work, which reduces productivity and could be considered a punishable event. Alternatively, the worker 102 must take time to fill out a suggestion form or log into a computer and send an email to a safety manager 112 or facility manager. Due to the time and inconvenience involved with doing so, workers 102 rarely follow through with reporting their suggestions.

However, in the system 10 presented, when the worker 102 has an idea or suggestion, the worker 102 presses the event trigger 36. In one or more arrangements, to distinguish this notable event from a safety issue (such as an accident or near miss) the worker 102 presses a separate notable event button or they press the event trigger 36 twice or three times or whatever the configuration is to discern that this engagement of the event trigger 36 is for reporting a notable event or suggestion and not for reporting an immediate safety concern. In doing so, the safety device 12 assigns the event a lower priority, that is not expedited, in the same manner as a safety event.

In one or more arrangements, in response to the event trigger 36 being activated, in the manner to identify that the worker 102 desires to record or submit a suggestion or identify a notable event, microprocessor 18 prompts worker 102 to provide a recitation or description of the notable event or suggestion through an audible indication using audible indicator 38 or a visual indication using visual indicator 40 or a physical indicator using physical indicator 42. In one or more arrangements, the audible indication is an audible tone, such as a beep or series of beeps, or audible instructions such as "A notable event was detected, please describe what happened." In response, the worker 102 is trained to describe what occurred or what their suggestions are, which gives the worker 102 an opportunity to contemporaneously describe the events or suggestions at or near the time they occurred. This eliminates the potential that the worker 102 forgets what happened or confuses what happened in this event with another event. This also essentially eliminates the barriers to providing their suggestions for improvement as the worker 102 does not have to leave their work station, they don't have to fill out any paperwork or type out anything (which may be a substantial barrier for many workers 102). In contrast, the worker 102 can simply speak their suggestions while continuing to work. The safety device 12 also stores the information related to the time and place of the notable event, such as location, time, and what the sensors 30 sensed for inclusion in a notable event report.

In one or more arrangements, when the event trigger 36 is activated in a manner indicating that a notable event has been encountered, the safety device 12 assigns this event a lower priority than a safety issue such as a near miss or an accident. Safety device 12 develops a notable event report which includes the spoken words of the worker 102, which may be retained as spoken words and/or may be converted to text, as well as the time, location and any other pertinent information that is sensed by the sensors 30 of safety device 12.

In one or more arrangements, this information is stored on memory 20 of safety device 12 until the safety device 12 is connected to charging base 118 at which point the information is transmitted over electronic network 104 to database 34 and other components of the system 10 where the information is contained within a notable event report which is provided to safety manager or facilities manager or other manager or team for their consideration and attention.

In alternative arrangement, this information is stored on memory 20 until it is convenient for safety device 12 to transmit this information over the air to the other components of system 10, such as database 34, charging base 118, and/or management software 108. Again, because the information is deemed not to be an immediate safety concern this information is deemed to be of a lower priority level and is not expedited. Meaning that the safety device 12 may be allowed to transmit the information at a time convenient for the safety device 12, such as when the safety device 12 establishes a strong signal with electronic network 104.

In another arrangement, the information related to the notable event may be treated in the same manner as the safety event information described above. However, by providing notable event information in the same and undiscernible manner as safety information, this has the potential of distracting the safety manager 112 from responding quickly to true safety concerns and issues.

In one or more arrangements, the system 10 combines all the notable event reports into a single report that is provided to the safety manager 112, facility manager or other manager or team on a daily, weekly, monthly, or quarterly basis, or on any other basis that is convenient and facilitates allocation of proper resources to these notable events.

End of Shift:

At the end of their shift, in association with the process of clocking out, worker 102 removes their safety device 12, scans in the ID 44 and/or plugs safety device 12 in through port 28 into charging base 118 which connects to electronic network 104 (which also charges safety device 12 for the next use) and management software 108 retrieves the information stored on safety device 12 to develop a shift report and/or incident reports and/or notable event reports for the worker's shift.

In one or more arrangements, after turning in the safety device 12 at the end of their shift, the worker 102 is provided with a log of all items that were sensed as potential accidents or near misses and/or notable events. The information related to each of these potential accidents or near misses and/or notable events is provided to the worker 102 such as time, position, temperature, light level, air quality, volume, CO level, the audible recording or converted text of the contemporaneous recording of the incident or notable event. The worker 102 is then provided the opportunity to confirm or deny whether an accident or near miss or notable event actually occurred, and provide additional information regarding the potential accident or information or notable event. This provides the worker 102 the opportunity to clarify the record and provide additional information.

Threshold Example

In one or more arrangements, microprocessor 18 is programmed to indicate whether particular thresholds are exceeded. As an example, when 90% of a volume threshold is exceeded, as is interpreted by microprocessor 18, a signal is transmitted to safety manager 112 informing the safety manager 112 of the potentially dangerous condition. Once received, the safety manager 112 can respond in an attempt to address the problem and reduce the volume in the affected area.

Similarly, when 90% of a volume threshold is exceeded, as is interpreted by microprocessor 18, a signal is transmitted to the worker 102 through audible indicator 38, visual indicator 40 and/or physical indicator 42 indicating to the worker 102 of a potentially dangerous condition. This information may be used by the worker 102 to correct the problem or exit the potentially dangerous area.

Mapping and Prediction:

With workers 102 using safety devices 12 and with safety devices 12 tracking the position of the worker 102 while sampling the environmental conditions surrounding workers 102 maps are easily developed of not just actual accidents, but of near misses as well, which is information that was never before easily collected. This information can be used to predict where future accidents or near misses are likely to occur. This information also can be used to inform safety managers 112 of the areas of manufacturing facility 100 that are the most dangerous or could use improvements.

This information can also be used to develop what are known as heat maps which can be used to show the concentration of certain conditions. That is, a heat map can be generated showing the most traveled or busiest areas of the manufacturing facility, a heat map can be generated showing the noisiest areas of the manufacturing facilities, a heat map can be generated showing the areas of the manufacturing facility that has the highest level of air contaminants, a heat map can be generated showing the temperature of the areas of the manufacturing facility, a heat map can be generated showing the light levels of the areas of the manufacturing facility. These heat maps provide insight into the conditions of the manufacturing facility that are actually experienced by the workers 102 themselves and provide insight never before obtained. These heat maps can be used to improve the conditions of the manufacturing facility. For instance, hallways and doorways can be widened at the areas of highest traveled areas, additional lighting can be added to the areas of lowest light, additional ventilation can be added to the areas of worst air quality, additional heating or cooling can be added to areas with the highest or lowest temperature, or any other corrective action can be provided. This ensures that the highest level of impact is provided for each investment. The system 10 also provides a feed-back loop for determining how effective the corrective action was by comparing heat maps before the corrective action and after the corrective action.

When specific areas of the manufacturing facility 100 are identified as the most likely to have an accident, information collected by sensors 30 of safety devices 12 can be used to determine the root cause of the accidents or near misses, such as low light levels, or high temperatures or low temperatures, or high volumes or high pitched volumes, too much congestion in high traffic areas or any other condition. Also, correlations can be generated between the great amount of aggregate data and information collected by safety devices 12 and accidents or near misses to reveal further information that can be used to reduce or eliminate accidents or near misses in the future.

The information from safety devices 12 and the correlations between the information and increased likelihood of accidents or near misses can be used to implement solutions, such as increasing lighting in accident-prone areas with insufficient lighting, widening hallways in accident prone congested areas, moving noisy tooling in accident prone areas with high volume levels, or the like.

In one or more arrangements, information about the environmental conditions of a workplace from a plurality of safety devices 12 used by a plurality of workers 102 over a period of time is aggregated into database, software, algorithms, artificial intelligence and/or any other data processing systems, manners or methods are used to detect correlations in the environmental conditions or other data and near misses and/or work place injuries.

Facility Layout:

Another benefit of the system 10 is that it tracks the position of workers 102 during the entire time they wear the safety device 12. As such, for the first time, a facilities manager has an accurate and unbiased start-to-finish track of the worker's travel path. Based on this information, the facilities manager can see the efficiencies and inefficiencies of the plant lay out and the facilities manager can redesign the facility layout based on this information. Once changes to the layout are made, the system 10 also provides a feed-back loop for determining how effective the corrective action was by comparing the travel paths or distances of workers 102 before the corrective action and after the corrective action. The facilities manager can get a numerical value on how far the worker 102 walked before and after the implementation of the new design. The facilities manager can use this information to calculate cost savings and justify the cost of implementing system 10 as well as the cost of implementing facility changes. The less time the worker 102 walks around the facility in theory the more time the worker can spend working which in theory leads to higher efficiencies, higher productivity, and higher profits.

Safety OSHA Audit and Workers Comp Claims:

One benefit of using system 10 is that the information collected by safety devices 12 may be used as evidence to show compliance in OSHA audits and therefore may reduce the liability of the company. Another benefit of using system 10 is that the information collected by safety devices 12 may be used as evidence in worker comp claims and therefore may reduce the liability of the company. Another benefit of merely implementing the system 10 as well as utilizing the information provided by the system 10 is that this may reduce the insurance premiums (as the system 10 helps to prevent and avoid costly injuries).

In one or more arrangements, when an accident does occur, the system 10 is configured to format information and data collected by the data to be entered directly into the required fields of an OSHA accident report. This saves time, money and ensures that the proper and thorough information is provided.

Example of Core, Holster and Attachment Member

With reference to FIGS. 5-14, one configuration of a safety device 12 is presented that includes a core 14, holster 120 and attachment member 16 among other components as is described herein.

Core:

Core 14 is formed of any suitable size, shape and design and is configured to house the electronic components of safety device 12 and fit in and be held by holster 120 in a removable manner. In the arrangement shown, as one example, core 14 includes an upper end 122, a lower end 124, opposing sides 126, an exterior surface 128, a back wall 130 and a forward wall 132. In the arrangement shown, as one example, the size and shape of core 14 narrows slightly as it extends from upper end 122 to the lower end 124. This slight narrowing facilities the insertion of core 14 within holster 120 and ensures that core 14 may be held within holster 120 in a removable manner while ensuring that the core 14 does not come out of holster 120 in an unintentional manner. Also, in the arrangement shown, core 14 slightly narrows as it extends from the back wall 130 to the forward wall 132 so as to also facilitate easy insertion within holster 120 while preventing unintentional removal of core 14 from holster 120.

More specifically, in one or more arrangements, as is shown, the forward wall 132 and back wall 130 narrow slightly toward one another as they extend from upper end 122 to lower end 124 such that the lower end 124 is slightly narrower or slightly smaller in stature than the upper end 122. Similarly, opposing sides 126 of core 14 narrow slightly toward one another as they extend from upper end 122 to lower end 124 such that the lower end 124 is slightly narrower or slightly smaller in stature than the upper end 122.

Also, as is shown, opposing sides 126 angle toward one another as they extend from back wall 130 to forward wall 132. Such that the forward wall 132 or forward side of core 14 is slightly narrower or slightly smaller in stature than the back wall 130 or back side of core 14. In one or more arrangements, as is shown, the shape of core 14 slightly curves or contours so as to comfortably fit around the worker's arm. In this arrangement, the back surface of the back wall 130 has a slightly concave shape and the forward wall 132 has a slightly convex shape. This slightly curved or arcuate shape makes core 14 slightly more comfortable to wear. In an alternative arrangement, the forward wall 132 and/or back wall 130 are relatively flat or straight or not curved whereas the back wall of the holster 120 is curved in a concave manner thereby providing a comfortable feel for worker 102.

Also, as is shown, the upper end 122 and lower end 124 of core 14 include end walls 134. The opposing end walls 134 angle toward one another as they extend from back wall 130 to forward wall 132. That is, the upper positioned end wall 134 connects at its upper end to back wall 130 and at its sides to the upper end of sides 126 and extends slightly downward therefrom until connecting at its lower end to the upper end of forward wall 132. Similarly, the lower positioned end wall 134 connects at its lower end to back wall 130 and at its sides to the lower end of sides 126 and extends slightly upward therefrom until connecting at its upper end to the lower end of forward wall 132.

In the arrangement shown, core 14 is relatively small and has a low profile with a smooth exterior surface 128. The small size and smooth exterior surface 128 and configuration of core 14 helps to prevent the safety device 12 from being in the way while being worn and further prevents the safety device 12 from being hung-up or caught during use thereby causing a safety issue itself.

In the arrangement shown, as one example, the exterior surface 128 of the core 14 includes indicia 136 thereon. Indicia 136 can be any visual indication such as a logo or design, a model number, a unit number, the ID 44 of that particular core 14, instructions, lost and found information, owner info, or any other information. This indicia 136 may be included on the forward wall 132, which is outwardly facing and visible to others, or indicia 136 may be on back wall 130, sides 126, upper or lower end walls 134 or on any other portion of core 14. The inclusion of indicia 136 may improve the ease of use of system 10 by allowing for quick visual identification of core 14.

In one or more arrangements, as is shown, the upper positioned end wall 134 includes visual indicator 40 therein. In the arrangement shown, as one example, this visual indicator 40 is a transparent or semitransparent component positioned in the exterior surface 128 of core 14 that is positioned to cover or operably connect to a light or LED housed within the hollow interior of core 14 which is configured to cover the light or LED to protect it during wear while facilitating the transport of light generated by the light or LED through the material of core 14 so that it can be visually seen by the worker 102 as well as others around the worker 102. While only a single visual indicator 40 is shown in core 14, any number of visual indicators 40 are hereby contemplated for use. While the visual indicator 40 is shown in the upper positioned end wall 134, it is hereby contemplated for use that the visual indicator 40 may be positioned in any portion of core 14.

In one or more arrangements, the transparent component of visual indicator 40 may double as a light pipe 116 for light sensor 30D, or alternatively, this component is separated into two components or portions, with one component or portion serving to transport light from the light or LED to the exterior to serve as a visual indicator and the other component or portion serving as the light pipe 116 to transfer light from the exterior of core 14 to the light sensor 30D. In an alternative arrangement, a separate light pipe 116 is positioned in the exterior surface 128 of core 14 and facilitates the transfer of light from the environment to the light sensor 30D. Light pipe 116 is operatively connected to the light sensor 30D within core 14 and facilitates transfer of light from the environment to the light sensor 30D for tracking of light conditions around the worker.

In one or more arrangements, as is shown, the upper positioned end wall 134 includes one or more openings 114 therein. In the arrangement shown, as one example, one or more openings 114 provide a passageway through the material of core 14 thereby providing access to the sensors 30 held within core 14, such as sound sensor 30A, air quality sensor 30E or any other sensor 30 that requires access to air for sensing purposes. While only a single opening 114 is shown in core 14, any numbers of openings 114 are hereby contemplated for use. While the opening 114 is shown in the upper positioned end wall 134, it is hereby contemplated for use that the opening(s) 114 may be positioned in any portion of core 14.

In the arrangement shown, core 14 includes event trigger 36 therein. Event trigger 36 is formed of any suitable size, shape and design and is configured to be engaged by the worker 102 whenever an accident, near miss or notable event occurs. Once engaged, the event trigger 36 causes core 14 to store a high-density of information for a predetermined amount of time or period, as well as record audible information from the worker 102 and then transmit this information in a safety report or a notable event report or other report as is described herein. In the arrangement shown, as one example, event trigger 36 takes the form of a button placed in the exterior surface 128 of forward wall 132 which provides easy access to event trigger 36. In the arrangement shown, event trigger 36 is a recessed or depressed button which helps to prevent unintentional engagement of the event trigger 36 which helps to reduce the number of false-positives. In one or more arrangements, a raised ring or protective cover may be placed over or around event trigger 36 to further reduce unintentional engagement of event trigger 36. In the arrangement shown, event trigger 36 is positioned in the upper end of forward wall 132, however any other position is hereby contemplated for use.

In one or more arrangements, as is shown, the lower end of back wall 130 includes a step 138 therein. In the arrangement shown, as one example, step 138 is a notch or recess in the lower end 124 of the lower positioned end wall 134. This step 138 provides a structural feature that engages the lower end of holster 120 thereby facilitating full frictional and locking engagement between holster 120 and core 14. In the arrangement shown, step 138 is a generally right-angled groove that extends from side 126 to side 126 at the intersection of back wall 130 and lower end wall 134. A similar but opposite step 140 is positioned in the lower end of back wall 142 of holster 120. The engagement of step 138 of core 14 with the step 140 of holster 120 establishes the fully inserted position of core 14 within holster 120 and prevents the core 14 from sliding out of the lower end of holster 120.

In the arrangement shown, as one example, port 28 is positioned at or in association with step 138. In the arrangement shown, as one example, port 28 includes a plurality of conductive pins that are accessible at the lower end of back wall 130. The pins of port 28 facilitate charging of the power source 26 within core 14 when core 14 is plugged into charging base 118. The pins of port 28 facilitate data-transfer from memory 20 to the other components of system 10 when core 14 is plugged into charging base 118. The position of port 28 in the lower end of back wall 130 at step 138 provides protection for the pins of port 28 when core 14 is fully inserted within holster 120. This is because, when core 14 is held within holster 120, port 28 is covered by the back wall 142 and step 140 of holster 120.

A detent 144 is also positioned in the lower end of back wall 130. Detent 144 is any device or component that helps to facilitate locking but removable connection of core 14 to holster 120. In the arrangement shown, detent 144 of core 14 is an angled recess that is configured to receive a corresponding detent 146 positioned in the lower end of back wall 142 of holster 120. In the arrangement shown, as one example, detent 146 in the back wall 142 of holster 120 is angled protrusion that fits with close and tight tolerances and frictional engagement within the detent 144 of core 14 when core 14 is fully inserted within holster 120. Any number of detents 144, 146 are hereby contemplated for use as is any size, shape and design for detents 144, 146.

Holster:

Holster 120 is formed of any suitable size, shape and design and is configured to house and hold core 14 therein in a removable manner while core 14 is worn by a worker 102. In the arrangement shown, as one example, holster 120 includes an upper end 148, a lower end 150, opposing side walls 152, and a back wall 142 that form an opening 154 that is sized and shaped to receive core 14 therein. In the arrangement shown, as one example, the size and shape of opening 154 of holster 120 narrows slightly as it extends from upper end 148 to the lower end 150 in conforming shape with the exterior surface 128 of core 14. This slight narrowing facilitates the insertion of core 14 within holster 120 and ensures that core 14 may be held within holster 120 in a removable manner while ensuring that the core 14 does not come out of holster 120 in an unintentional manner. Also, as is shown, opposing side walls 152 angle toward one another as they extend from upper end 148 to lower end 150. This causes the opening 154 therein to be a slightly narrower or slightly smaller at the lower end 150 of opening 154 as opposed to the upper end 148.

In one or more arrangements, as is shown, the shape of holster 120 slightly curves or contours so as to comfortably fit around the worker's arm. In this arrangement, the back surface of the back wall 142 has a slightly concave shape. This slightly curved or arcuate shape makes holster 120 slightly more comfortable to wear.

In the arrangement shown, holster 120 is relatively small and has a low profile with a smooth exterior surface 156. The small size and smooth exterior surface 156 and configuration of holster 120 helps to prevent the safety device 12 from being in the way while being worn and further prevents the safety device 12 from being hung-up or caught during use thereby causing a safety issue itself.

In one or more arrangements, as one example, the exterior surface 156 of the holster 120 includes indicia 136 thereon. Indicia 136 can be any visual indication such as a logo or design, a model number, a unit number, the ID 44 of that particular holster, the owner's name, instructions, lost and found information, or any other information. This indicia 136 may be included on the on any portion of holster 120.

In one or more arrangements, as is shown, the lower end of back wall 142 includes a step 140 therein. In the arrangement shown, as one example, step 140 is a generally right angled protrusion in the lower end 150 back wall 142. This step 140 provides a structural feature that engages the lower end of core 14 thereby facilitating full frictional and locking engagement between holster 120 and core 14. In the arrangement shown, step 140 is a generally right-angled protrusion that extends from side wall 152 to side wall 152 at the intersection of back wall 142 and side walls 152 at the lower end 150 of holster 120. A similar but opposite step 138 is positioned in the lower end of core 14. The engagement of step 138 of core 14 with the step 140 of holster 120 establishes the fully inserted position of core 14 within holster 120 and prevents the core 14 from sliding out of the lower end of holster 120.

A detent 146 is also positioned in the lower end of back wall 142. Detent 146 is any device or component that helps to facilitate locking but removable connection of core 14 to holster 120. In the arrangement shown, detent 146 of holster 120 is an angled protrusion that is configured to engage and be received within a corresponding detent 144 positioned in the lower end of back wall 130 of core 14. In the arrangement shown, as one example, detent 146 in the back wall 142 of holster 120 is angled protrusion that fits with close and tight tolerances and frictional engagement within the detent 144 of core 14 when core 14 is fully inserted within holster 120. Any number of detents 144, 146 are hereby contemplated for use as is any size, shape and design for detents 144, 146.

Holster 120 is configured to be connected to worker 102 by any manner, method or means. In one or more arrangements, as is shown, holster 120 includes an opening 158 positioned at each opposing side of holster 120. These openings 158 are configured to receive or connect to a portion of attachment member 16. In the arrangement shown, attachment member 16 is an elastic band 16 that extends between opposing ends 160. In the arrangement shown, the ends 160 of bands 16 are passed through the openings 158 of holster 120 and the band is tightened on itself by way of the frictional engagement of a hook-and-loop arrangement (such as Velcro® or the like systems) buttons, snaps, or any other manner or method of connecting two components together. In this way, holster 120 and core 14 are comfortably connected to worker 102. In an alternative arrangement, the worker 102 can pass their belt though the openings 158 and attach the holster 120 and core 14 in that manner.

In an alternative arrangement, instead of holster 120 having a band that serves as an attachment device 16, attachment device 16 is a clip that can be clipped onto a user's shirt, helmet, belt or any other piece of clothing or equipment.

It has been found that workers 102 like having their own bands (attachment devices 16) and their own holsters 120. This is because the worker 102 actually physically engages these components. By having personal bands and holsters 120 this is more sanitary and comfortable for the workers 102. In addition, by separating the core 14, holster 120 and attachment member 16 band, this allows for replacement of the core 14, holster 120 and attachment member 16 band separately. That is, if one of these components fails or wears out (as is often the case with an elastic band as the attachment member 16) this single component of the system 10 can be replaced without throwing away the other components.

Themed Safety Devices:

In one or more arrangements, the attachment member 16, holster 120 and core 14 are colored with the colors of the companies that use them and include the logos or other indicia of the companies that use them. This provides a fun appeal to the system 10, and also makes it easier to identify who the owners of the components are.

In another arrangement, the worker 102 can order custom colored or themed holsters 120, bands 16 and/or cores 14, such as in the motif of their favorite sports team or the like.

Charging Base:

In the arrangement shown, system 10 includes a charging base 118. Charging base 118 is formed of any suitable size, shape and design and is configured to receive, charge and transfer information from and to cores 14. In the arrangement shown, as one example, charging base 118 includes a back wall 162 that includes a plurality of sockets 164 that are sized and shaped to receive cores 14 therein. When cores 14 are placed within sockets 164, cores 14 are charged by charging base 118 and data transfer occurs between core 14 and charging base 118 and the other components of the system 10.

Charging base 118 also includes a user interface 106, which in the arrangement shown is included in a lower wall 168. User interface 106 provides the ability for the workers 102 to interact with the charging base 118 and may include a plurality of sensors, a key pad, a biometric scanner, a touch screen, or any other input for information. As one example, at the beginning of a shift, a worker 102, with or wearing their own personal holster 120 engages the charging base 118 by biometrically scanning in with a finger or thumb print, a retinal scan, facial recognition, voice recognition or the like or any combination thereof; or alternatively, the worker 102 types in their name, employee ID number, swipes an employee ID card, scans in using their phone or any other manner or method of associating their personal identifier with the system 10.

Upon receiving this information, charging base 118 and system 10 identifies the worker 102 and allocates a core 14 held within the charging base 118 that is fully charged, or has the highest charge among the cores 14, and assigns that core 14 to that worker 102 by illuminating the core 14, illuminating the socket 164 that the core 14 is held in, or providing the socket number to the worker 102 or by identifying which core 14 the worker 102 is to take by any other manner, method or means. Also, in association with this process, system 10 programs core 14 with the proper threshold levels and other information that is particular to that worker's job. For instance, for a worker in a heavy industrial position that wears external protective gear (such as ear muffs) the thresholds will be substantially different than the thresholds for a worker in a light clerical role that does not wear any protective gear. This ensures that proper safety thresholds are identified for each worker 102 in each role. This ensures that unnecessary safety concerns are maintained at a minimum.

Once the proper core 14 has been identified to the worker 102, the worker 102 retrieves that core 14 from the charging base 118, slides the core 14 into their holster 120 and the worker 102 begins their shift and the core 14 begins recording information in the manner described herein.

At the end of the shift, the worker 102 returns the core 14 to the charging base 118. Once the core 14 is plugged into a socket 164, the charging base 118 begins charging the core 14 and begins retrieving data from the core 14 for distribution into the system 10 and saving into database 34 among other uses as is described herein. The system 10 also updates the software or firmware on the core 14 and prepares the core 14 for another use.

In one or more arrangements, charging base 118 includes its own communication equipment, such as a cellular communication module. In this arrangement, charging base 118 can communicate completely independently of the internet service or other communication service utilized by the manufacturing facility. This independence ensures that the charging base 118 has the best possible ability to get accurate and timely information to the database 34, electronic network 104, management software 108 and other components of the system 10, so as to ensure timely and accurate reporting of safety events, near misses, accidents, and notable events. This independent communication structure also prevents the addition of charging base 118 and system 10 from being a drag on the internet or other communication structure of the manufacturing facility. This independent communication also ensures that the charging base 118 itself can send out text messages and emails directly to the safety manager 112 or others without delay when an accident occurs. In an alternative arrangement, the charging base 118 connects to the internet or communication service utilized by the manufacturing facility. In yet another alternative arrangement, the charging base 118 includes both an independent communication structure as well as connecting to the internet or communication service utilized by the manufacturing facility which provides the benefits of redundancy and back-up in the event that one system is not working.

To be clear, core 14 may transfer data in any of a number of manners. In one or more arrangements, periodically during use core 14 transmits information to other components of the system 10. This may occur at a convenient time, such as when the core 14 establishes a strong wireless connection with other components of the system 10, or when there is low utilization on the system 10, or the like. In another arrangement, core 14 stores data on its memory 20 and transmits this data to other components of the system 10 when core 14 is plugged into charging base 118, directly into an internet-connected lead (such as an Ethernet cable, or mini-Ethernet cable, or the like). In another arrangement, core 14 transfers data both periodically through a wireless connection to other components as well as when core 14 is plugged into charging base 118 or another internet-connected device. In this way, the system 10 and/or core 14 can transmit information in the most efficient manner and in accordance with the urgency of the information. That is, urgent information, such as a safety issue, may be transmitted immediately, whereas mundane data collected for data mining purposes may be stored and transmitted in a more-efficient and less burdensome manner when core 14 is plugged into charging base 118. This flexibility of data transfer provides efficiencies and helps the system 10 operate in the most efficient manner possible.

Outdoor Version:

While the arrangements described primarily herein discuss use of core 14 and/or system 10 within a manufacturing facility where core 14 communicates using Wi-Fi or other close-proximity wireless communication technology, it is contemplated that in other arrangements it is desirable to use the system 10 outside of the constraints of a single building or a single manufacturing facility or campus. In these arrangements, core 14 is equipped with its own cellular communication module which facilitates the operation of the system 10 described herein without the need to be constrained to any particular geographic area. In this arrangement, core 14 communicates with system 10 in the manners described herein through communication with existing third-party cellular towers, much in the same way that a conventional cellular phone communicates with these towers. This information is then routed through the electronic network 104 to database 34 and the other components of system 10. This arrangement is desirable for companies that have a dispersed workforce such as package delivery companies such as Fed-Ex and UPS, railroads, companies that do on site repair and installation such as heating and air conditioning companies and plumbing companies, or any other company with a dispersed workforce that is not housed or constrained within a building or campus. Other than having cellular communication capabilities, this outdoor version of the core 14 operates in a similar if not identical manner to that described herein and facilitates the accomplishment of the same if not identical objectives.

Figure 18:
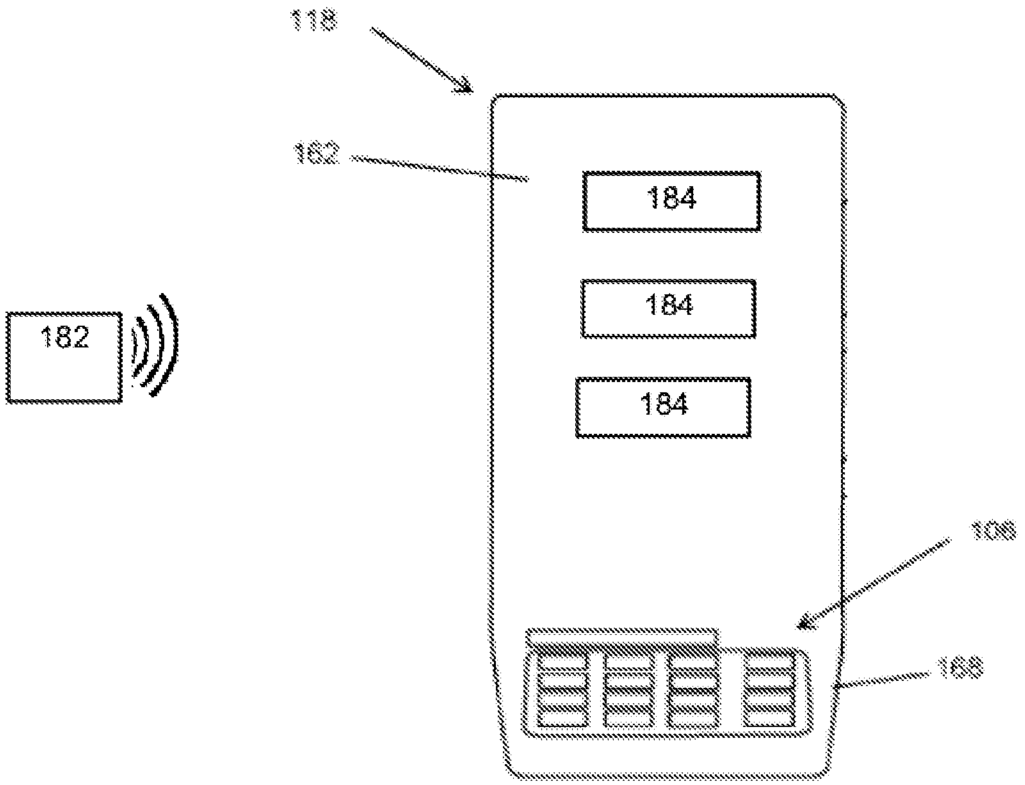
FIG. 18 is a perspective view of a base similar to the charging base shown in FIGS. 15-17; the base including a number of sensors in lieu of charging sockets for charging cores of safety devices.
Figure 19:
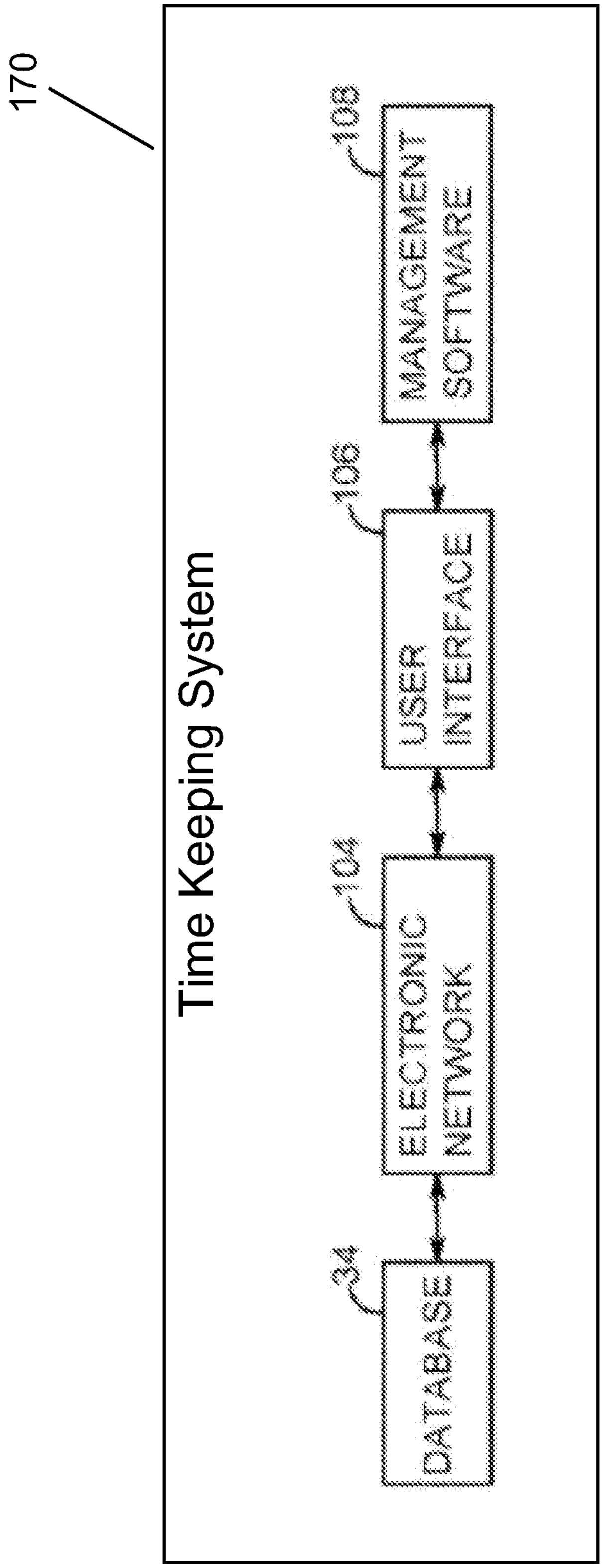
FIG. 19 is a plan view of a time keeping system, in accordance with one or more arrangements, including a database, an electronic network, a user interface, and management software.
Figure 20:
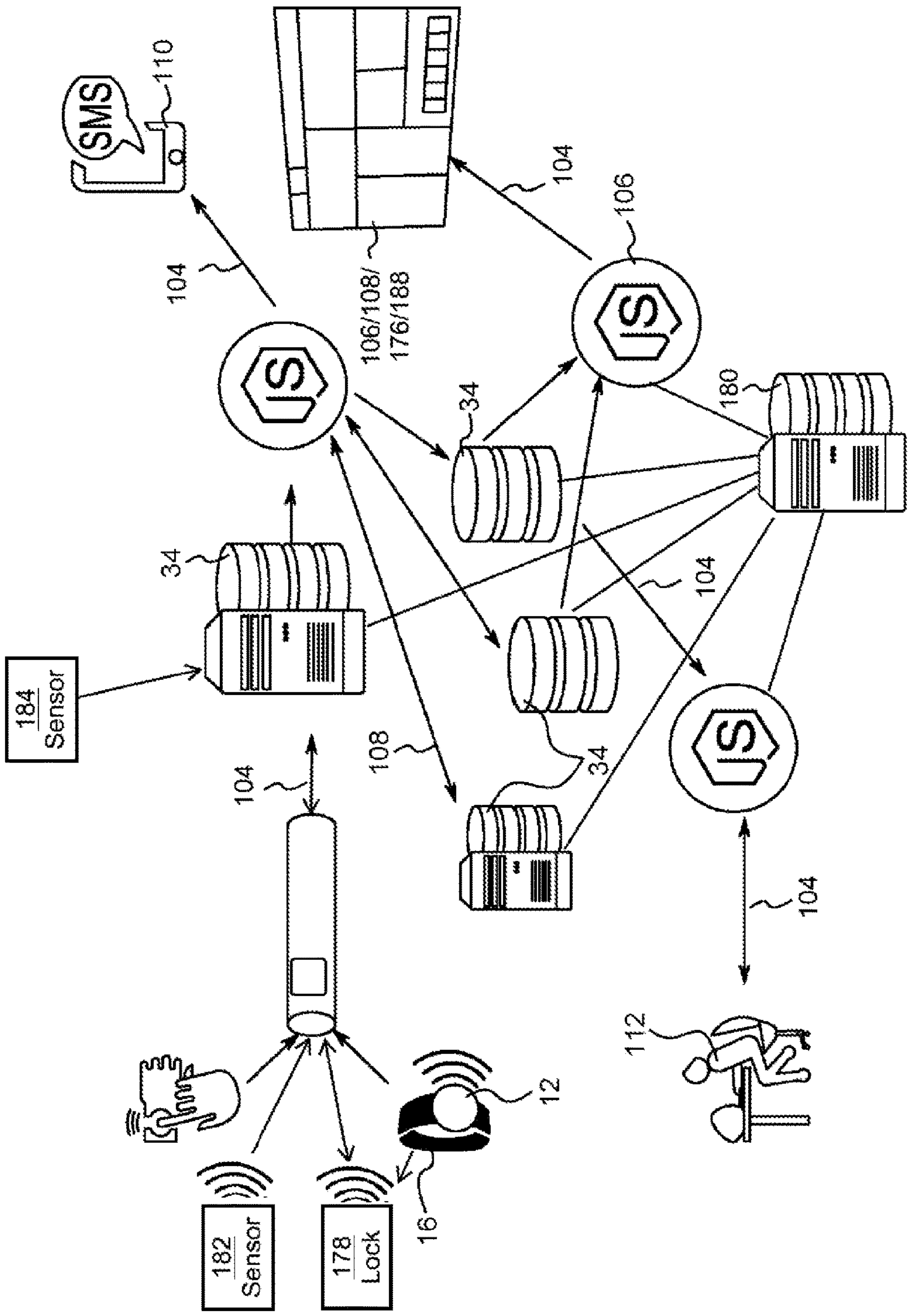
FIG. 20 is a plan view of the system described in FIGS. 1 and 2, the view showing a safety device and locking devices in electronic communication with the components of the system including a database, user interface, data processing system, and management software.

Alternative Arrangement(s):

With reference to FIGS. 18-20 various additional features and alternatives of system 10 are presented. Some components of the system presented in FIGS. 18-20 are similar to components of the system 10 presented in FIGS. 1-17 and therefore all of the teaching presented herein with respect to FIGS. 1-17 applies equally to and is incorporated into the teaching presented in FIGS. 18-20 unless specifically stated otherwise.

Time Keeping System 170:

In one or more arrangements, system 10 includes a time keeping system 170. The time keeping system 170 is formed of any suitable size, shape and design and is configured to track times that workers 102 clock in for the start of their work shift and clock out for the end of their work shift or for breaks, lunch, etc. The time keeping system 170 is configured to track times that workers 102 clock in and clock out by using any suitable set of operations, processes, and/or activities.

In the arrangement shown, as one example, time keeping system 170 is formed by charging base 118, management software 108, and one or more databases 34 connected by electronic network 104. In this example arrangement, charging base 118 and system 10 base are configured to track clock in and clock out times as part of the process for allocating cores 14 to workers 102.

As one example, at the beginning of a shift, a worker 102, with or without wearing their own personal holster 120 engages the charging base 118 to identify the worker, for example, by biometrically scanning (fingerprints, face recognition, retinal scan, etc.), entry of information, use of a key or ID card, scanning in using their phone or other electronic device and/or any other manner or method or combination thereof of associating their personal identifier with the system 10. Upon receiving this information, charging base 118 and system 10 identifies the worker 102 and allocates a core 14 to the worker 102, as previously described, and logs the current time as the clock in time for the worker 102 in a database 34. At the end of the shift, the worker 102 returns the core 14 to the charging base 118. Once the core 14 is plugged into a socket 164, the charging base 118 begins charging the core 14 and begins retrieving data from the core 14 for distribution into the system 10 and saving into database 34 as previously described. At this time, charging base 118 and system 10 log the current time as the clock out time for the worker 102 in a database 34. Management software 108 is configured to access the clock in and clock out times in database 34 to facilitate various human resource operations including but not limited to, for example, generation of time sheet reports, calculation of payroll, and/or evaluation of employee performance to name a few. At the time of clock in and/or clock out, charging base 118 may perform biometric tests or scanning on the worker for screening and tracking purposes such as taking their temperature, blood pressure, or any other condition as is further described herein.

Geo Fencing Access Control System 174:

In one or more arrangements, system 10 includes a geo-fencing access control system 174. The geo-fencing access control system 174 is formed of any suitable size, shape and design and is configured to control access to and/or use of company resources based on position of workers 102 as indicated by sensors 30 of safety devices 12. The geo-fencing access control system 174 is configured to control using any suitable set of operations, processes, and/or activities.

In the arrangement shown, as one example, the geo-fencing access control system 174 includes a plurality of remote locking devices 178 and an access controller 176. Remote locking devices 178 are formed of any suitable size, shape and design and are configured to prevent physical access to or use of company resources when in a locked state, and permit physical access to or use of the company resources when in an unlocked state. Remote locking devices 178 may be used to restrict access and use of various company resources including but not limited to, for example, facilities, rooms, lockers, drawer, cabinets, elevators, doors, tools, machinery, computing systems, digital resources and/or phones to name a few.

In the arrangement shown, remote locking device 178 has a communication circuit configured to wirelessly communicate (or over wired communication) with safety devices 12 and communicate with other components via electronic network 104. In this example arrangement, remote locking device 178 also includes a locking mechanism. The locking mechanism is formed of any suitable size, shape and design and is configured to restrict access or operation to a particular resource in a locked state and permit access to the resource in the unlocked state. Access controller 176 is formed of any suitable size, shape and design and is configured to control access that each remote locking device 178 is to provide to each worker 102. In the arrangement shown, access controller 176 is incorporated with management software 108. In one or more arrangements, access controller 176 maintains a listing of workers 102 and respective access and use permission in a database 34. Permitted accesses and uses may be modified by an authorized user via the management software 108.

In operation, when a safety device 12 is in close proximity to remote locking device 178 while in a locked state, safety device 12 transmits the unique ID 44 of the safety device 12 to remote locking device 178. In response to receiving the unique ID 44, remote locking device 178 sends a query to access controller 176 to determine if the worker 102 associated with the unique ID 44 should be granted access. In response to receiving the query, access controller 176, determines the worker 102 associated with unique ID 44 and then determines from database 34 if the worker 102 has permission to access the resource associated with the remote locking device 178. Access controller 176 then provides a response to the remote locking device 178 indicating whether or not the worker 102 is to be permitted access. If the response indicates that the worker 102 is permitted access, the remote locking device 178 transitions to the unlocked state remains in the locked state. Otherwise, the remote locking device 178 remains in the locked state.

When transitioning to the unlocked state, some remote locking devices 178 may remain in the unlocked state for a certain period of time. For example, a remote locking device 178 connected to a door, may transition to an unlocked state for 5 seconds to permit a permitted worker 102 to open the door. Conversely, some remote locking devices 178 may be configured to remain in the unlocked state while the safety device 12 having the unique ID 44 remains in close proximity. For example, a remote locking device 178 connected to a milling machine, may remain unlocked to permit use by an authorized worker.

Health Monitoring System 188:

In one or more arrangements, system 10 includes a health monitoring system 188. Health monitoring system 188 is formed of any suitable size, shape and design and is configured to monitor and/or track one or more types of biometric data indicative of worker 102 health using any suitable set of operations, processes, and/or activities. In some various arrangements, for example, health monitoring system 188 may be formed as part of management software 108, charging base 118, data processing system 180, or a combination of these and/or other component.

Illness Detection:

In one or more arrangements, health monitoring system 188 is configured to determine if a worker 102 is not in normal health (e.g., is likely to have a fever) based on one or more biometric measurements of the worker 102 taken by one or more sensors (e.g., 30, 182, and/or 184).

In one or more arrangements, health monitoring system 188 is configured to determine if a worker 102 is likely to have a fever based on temperature measurements of the worker 102 taken by one or more sensors (e.g., 30, 182, and/or 184).

Health monitoring system 188 may be configured to determine if a worker 102 is likely to have a fever using any suitable set of operations, processes, and/or activities. In one or more arrangements, health monitoring system 188 is configured to determine if a worker 102 is likely to have a fever by: receiving a temperature measurement from a sensor or retrieving a recent temperature measurement of the worker 102 from a database 34 and comparing the temperature measurement to a threshold temperature (e.g., 100° F., 101° F., 102° F. . . . ). If the temperature measurement exceeds the threshold temperature, the worker 102 is determined to be likely to have a fever. Conversely, if the temperature measurement does not exceed the threshold temperature, the worker 102 is determined to be not likely to have a fever. If the system 10 determines that a sensed biometric parameter of a worker 102 is outside of norms or outside of predetermined thresholds, the worker 102 is screened. That is, the system 10 does not allocate a core 14 to the worker 102 and worker 102 is identified for further testing, screening and/or health monitoring protocols so as to ensure worker 102 is not suffering from a communicable disease or other ailment that could affect the performance of worker 102 and/or infect other workers 102.

In one or more arrangements, health monitoring system 188 is configured to make more accurate determinations based on a comparison of temperature readings of the worker 102 to previous temperature readings of the worker 102. Studies have shown that the normal body temperature cay vary from person to person over a wide range (e.g., approximately 97-99° F.). Accordingly, one person having a low normal body temperature may not exceed a standard threshold temperature when having a fever, whereas another person, having a high normal body temperature may exceed a standard threshold temperature when temperature is only slightly elevated.

In this example arrangement, health monitoring system 188 is configured to record and store the sensed biometric information of worker 102 over time (e.g. each time they clock in and clock out). Health monitoring system 188 is also configured to compare a present reading with prior readings, or an average or trend of average readings to determine if worker 102 is likely to have a fever by: retrieving a prior reading, an average, a trend line, a personal baseline or other calculated number representative of the temperature of the worker 102 from database 34, receiving current or recent temperature measurement from a sensor or database 34, and comparing the current/recent temperature measurement to the baseline temperature for the worker 102. The baseline temperature may be, for example, an average of temperature measurement of the worker 102 over a period of time (e.g., a day, week, or month), a moving average of temperature measurements of the worker 102, a value manually input into the system, or any other value representing the normal body temperature of the worker 102. If the current/recent temperature measurement exceeds the baseline temperature by a specified threshold amount (e.g., 2° F.), the worker 102 is determined to be likely to have a fever. If the current/recent temperature measurement does not exceed the baseline temperature by the threshold amount, the worker 102 is determined to not be likely to have a fever. As stated above, if worker 102 is determined to fall outside of the norms or above a threshold, worker 102 is screened for further testing.

In one or more arrangements, health monitoring system 188 may utilize also other biometric data in addition to and/or in lieu of body temperature in determining whether a worker 102 is likely to have a fever. For example, it is recognized that body temperature of a worker 102 may vary throughout the day. For instance, a worker 102 may have a lower temperature in the morning and higher temperatures in the late afternoon and evening, as activity level, food and fluid intake, and/or metabolism changes. In one or more arrangements, health monitoring system 188 may conduct one or more additional biometric measurements (e.g. heart rate or perspiration rate or blood pressure or oxygen levels, etc.) to adjust temperature measurement to account for the activity level of the worker. For instance, in one or more arrangements, the health monitoring system 188 may be configured to maintain several baseline temperatures in database 34 for worker 102 at different heartrates. In one or more arrangements, health monitoring system 188 may be configured to determine if worker 102 is likely to have a fever by: obtaining a recent/current temperature measurement and corresponding heart rate; retrieving a baseline temperature of the worker 102 in database 34 that is closest to the recent/current heart rate measurement; and comparing the retrieved baseline temperature to the recent/current temperature measurement. If the recent/current temperature measurement exceeds the retrieved baseline temperature by a threshold amount, the worker 102 is determined to be likely to have a fever. Conversely, if the recent/current temperature measurement does not exceed the retrieved baseline temperature by the threshold amount, the worker 102 is determined to be not likely to have a fever.

Entrance Screening:

In one or more arrangements, health monitoring system 188 is configured to operate in conjunction with charging base 118 and/or time keeping system 170 to facilitate screening of workers 102 arriving for work to identify workers 102 likely to have fever.

For example, at the beginning of a shift, a worker 102 engages the charging base 118 to identify the worker 102, for example, by biometrically scanning, entry of information, use of a key or ID card, scanning in using their phone or other electronic device and/or any other manner or method of associating their personal identifier with the system 10. Upon receiving this information, health monitor system 188, charging base 118, and/or system 10 identify the worker 102. After identifying the worker, health monitor system 188 obtains a current temperature measurement of the worker 102 and/or other biometric measurements using one or more wired or wireless measurement sensors (e.g., 182, 184) positioned in or nearby charging base 118. In some arrangements, temperature measurements may be obtained using one or more touchless temperature sensors (e.g., infrared temperature sensors and infrared thermo-imaging cameras). Touchless temperature measurements may help to prevent transfer of any contagions other workers 102. In some arrangements, health monitoring system 188 stores the temperature reading of the working in database 34.

After obtaining a temperature measurement, health monitoring system 188 determines whether the worker 102 is likely to have a temperature as previously described. If health monitoring system 188 determines that the worker 102 is not likely to have a fever, charging base and allocates a core 14 to the worker 102 as previously described and/or time keeping system 170 logs the current time as the clock in time for the worker 102 as previously described. If health monitoring system 188 determines that the worker 102 is likely to have a fever, the health monitoring system 188 may take a number of various actions, which is described in more detail herein such as screening the worker 102 for further testing or dismissal for the work day, several days or any predetermined amount of time.

In some arrangements, health monitoring system 188 may additionally or alternatively be configured to screen workers 102 when they return core 14 to the charging base 118 and/or clock out at the end of their shifts. For instance, at the end of the shift, the worker 102 returns the core 14 to the charging base 118. Once the core 14 is plugged into a socket 164, the charging base 118 begins charging the core 14 and begins retrieving data from the core 14 for distribution into the system 10 and saving into database 34 as previously described. At this time, time keeping system 170 may clock the worker 102 out and health monitoring system 188 may evaluate temperature of worker 102 as previously described using sensors readings measured by the core 14 during the shift, current temperate measurement from sensors 182 and/or 184, or a combination thereof.

In this way, the time keeping system 170 of charging base 118 is used to enforce or ensure that workers 102 are screened using health monitoring system 188. In this way, screening is almost certainly assured of all workers 102.

Use of System Without Safety Devices 12:

It is contemplated that system 10 may be adapted to provide many features and functions described herein with data gathered from sensors or sources other than safety devices 12. While several arrangements are primarily described discussed with reference to use of sensors 30 of safety device 12 to gather data, the embodiments are not so limited. Rather, in one or more arrangements, system 10 is configured to gather data using external sensors (e.g., 182 and 184) in addition to or in lieu of sensors 30. For example, in one or more arrangements, system 10 includes one or more external sensors 182 and/or 184, database 34, user interface 106 and/or management software in an arrangement configured to operate without safety devices 12. As one illustrative example, as previously described, system 10, user interface 106 and/or management software may be configured to perform health monitoring and entrance screening using an infrared temperature sensor. For instance, as shown in FIG. 18, as one example arrangement, charging base 118 similar to that described with reference to FIGS. 15-17 may be implemented with a number of sensors 182 and 184 (e.g., infrared temperature sensor and camera) in lieu of charging sockets 164 for charging cores 14 of safety devices 12.

In one or more arrangements, for example, charging base 118 is configured with system 10, user interface 106 and/or management software to provide time keeping system 170 and/or health monitoring system 188 with entrance screening at previously described.

Figure 15:
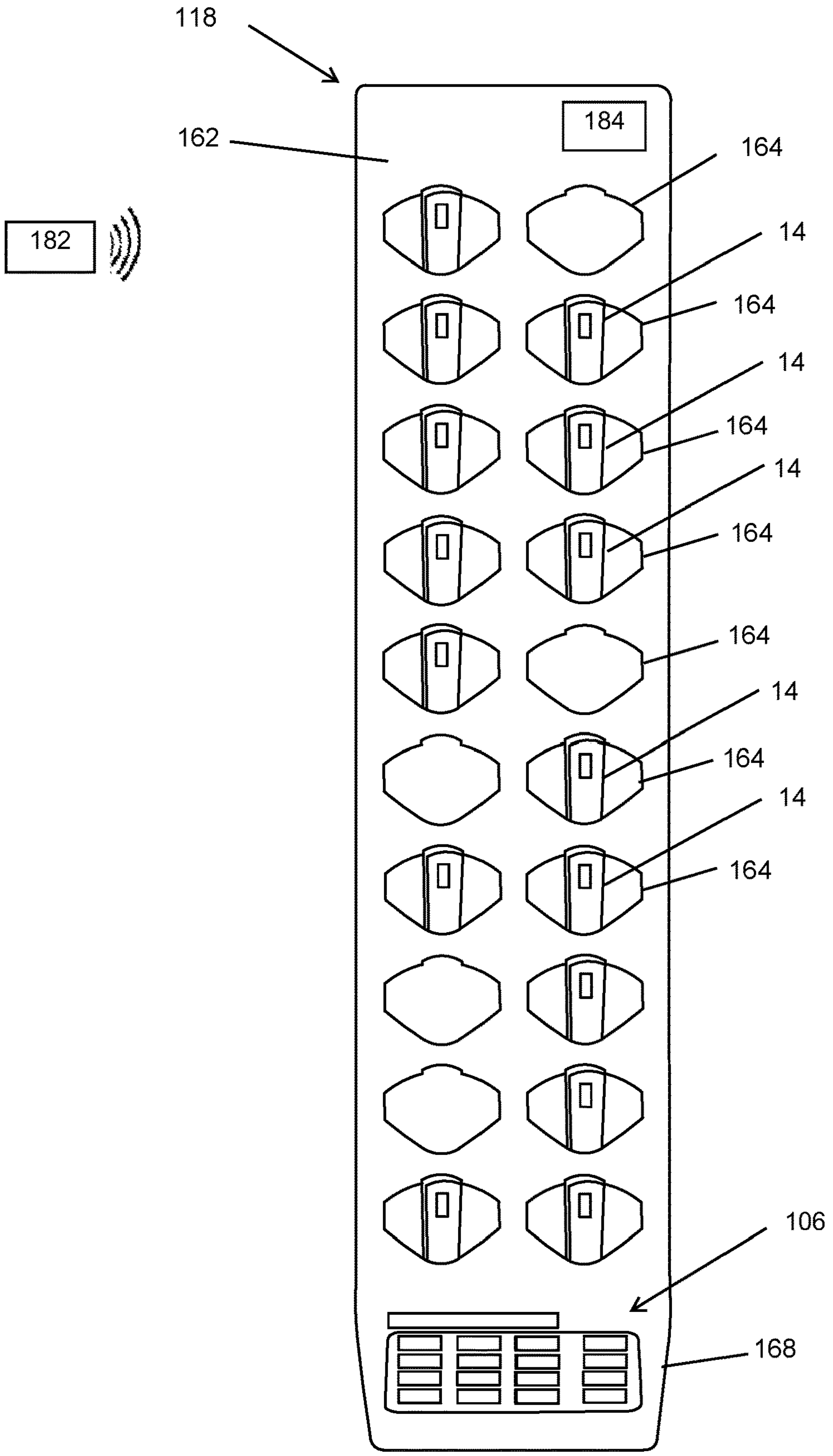
FIG. 15 is an elevation view of a charging base of the system; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker; the view showing a plurality of sockets occupied by cores and a plurality of sockets unoccupied by cores.
Figure 16:
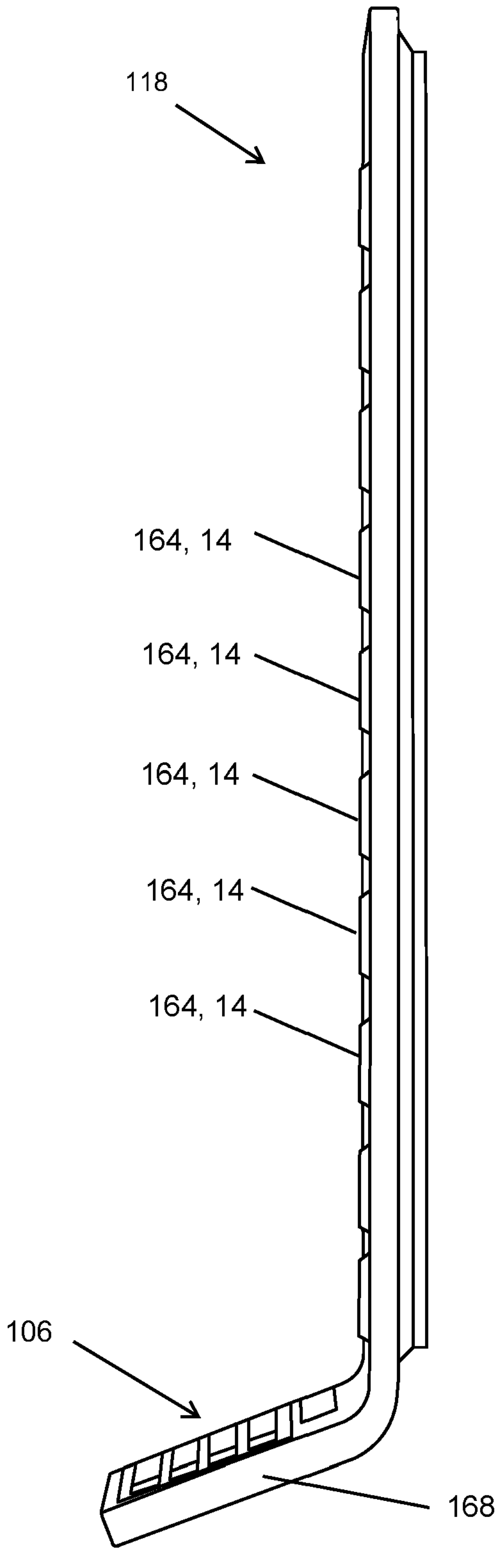
FIG. 16 is an elevation view of a charging base shown in FIG. 15; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker.
Figure 17:
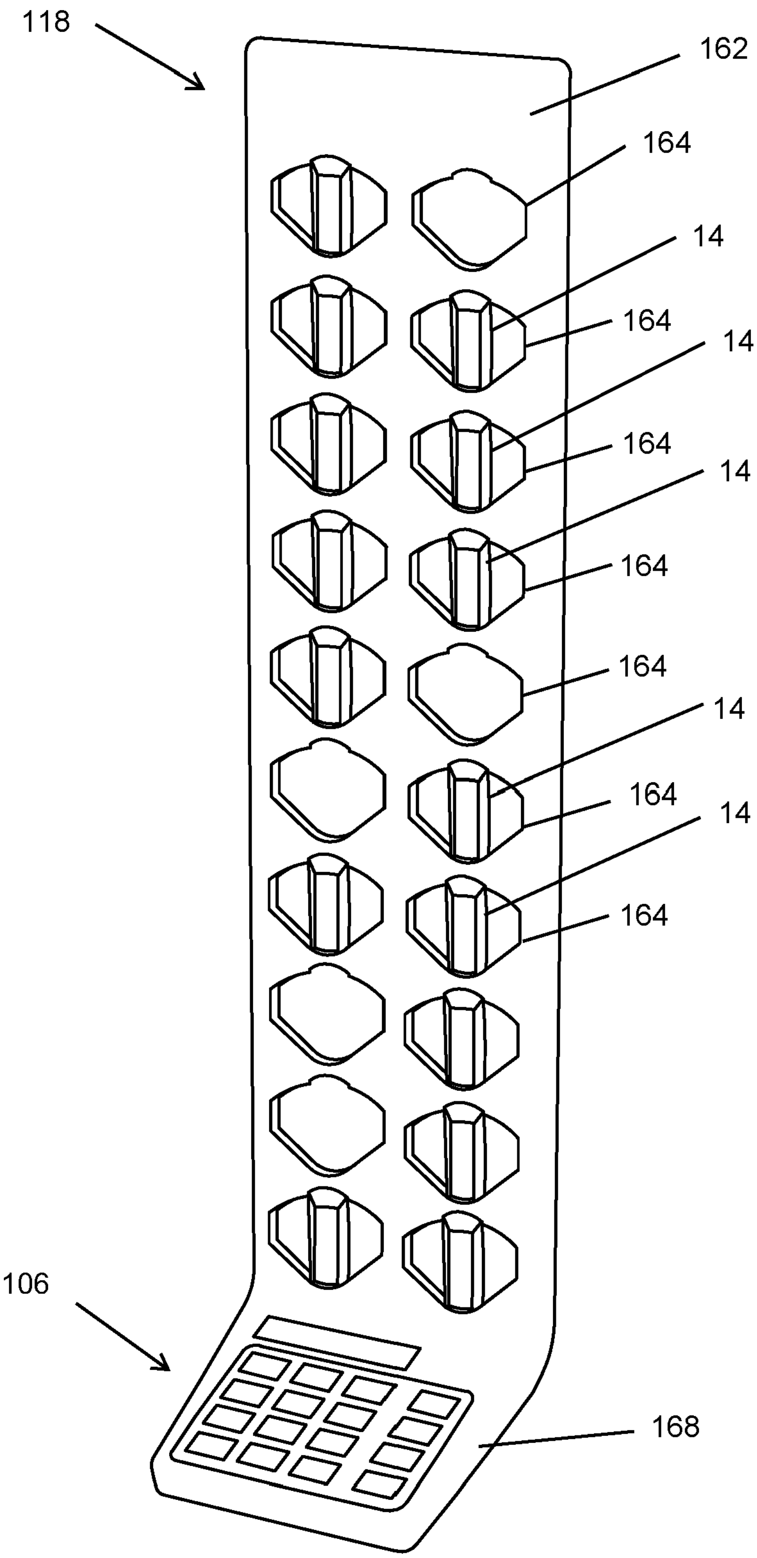
FIG. 17 is a perspective view of a charging base shown in FIGS. 15 and 16; the view showing the charging base having a back wall and a lower wall, the back wall having a plurality of sockets that are sized and shaped to receive cores therein such that once the cores are plugged into the charging base the cores are charged as well as data transfer occurs between the charging base (and the other components of the system) and the core; the view also showing a user interface positioned in the lower wall of the charging base, the user interface allows a worker to interact with the charging base, such as scanning in or typing in their user information so as to facilitate the allocation of a core to the worker; the view showing a plurality of sockets occupied by cores and a plurality of sockets unoccupied by cores.

In the arrangement shown, as one example, with reference to FIG. 15, hardwired external sensor 184 is positioned within charging base 118 in a position wherein hardwired external sensor 184 has a clear view of the worker 102 when the worker 102 interfaces with charging base 118. In this arrangement, as one example, hardwired external sensor 184 is positioned in the upper portion of charging base 118 above sockets 164 and cores 14. From this position, hardwired external sensor 184, which may be an infrared camera, a camera, or any other sensing device, has a clear view of the head and face of worker 102, which provides a consistent and accurate measurement of biometric parameters of worker 102. This may include taking the temperature of worker 102, doing a scan of the face or head or eyes of worker 102, or performing any other form of measurement or sensing.

Alerts and Mitigative Measures:

As previously indicated, in some arrangements health monitoring system 188 may perform a number of various actions in response to determining that the worker 102 is likely to have a fever. As some illustrative examples, in response to determining a worker 102 is likely to have a fever, health monitoring system 188 may perform one or more actions including but not limited to, for example, providing an warning to the user to keep a watch on their temperature, directing the worker 102 to talk to safety manager 112, nurse, doctor or other provider, providing an alert to safety manager 112, refusing to allocate a core 14 to the worker, and/or denying the worker 102 entrance, to name a few (e.g., using geo-fencing access control system 174).

In one or more arrangements, health monitoring system 188 is configured to take different actions depending on the severity of the worker's 102 fever. As an illustrative example, health monitoring system 188 may only give a warning to a worker 102 if the worker's temperature only exceeds their baseline temperature by a small amount (e.g., 1° F.). However, entrance if the worker's temperature exceeds their baseline temperature by a larger amount (e.g., 2° F.), health monitoring system 188 may provide an alert to safety manager 112, allocate personal safety equipment to the worker 102 (e.g., a mask, gloves, or disinfectant equipment), and/or refuse to allocate a core 14 to the worker, and/or deny the worker 102 entrance.

In one or more arrangements, health monitoring system 188 has a number of configurable settings that may be adjected by an authorized user via management software 108. For example, management software 108 may provide a graphical user interface for adjustment of the configurable settings of health monitoring system. Configurable settings may include but are not limited to, for example, selection of biometric data to be monitored/tracked by health monitoring system, conditions in which actions are to be performed (e.g., threshold temperatures), actions to be performed in response to such conditions being satisfied (e.g., in response to worker 102 temperature exceeding the threshold temperature).

Automated Cleaning System:

In one or more arrangements, user interface 106 of charging base 118 includes an automated cleaning system. The automated cleaning system is formed of any suitable size, shape and design and is configured to disinfect surfaces of user interface 106, safety device cores 14, and/or other touch surfaces of charging base 118 after use. In one or more arrangements, for example, the automated cleaning system includes an ultraviolet light configured to shine ultraviolet light on one or more surfaces to disinfect the surface(s). In some arrangements, the ultraviolet light is configured to constantly expose the surface to ultraviolet light. In some other arrangements, the ultraviolet light is configured to turn on after the surface is touched, or at predetermined times, or at times of non-use (e.g., in response to a button of user interface 106 being pushed, in response to detecting motion) and turn off after a period of time sufficient to disinfect the surface. Additionally or alternatively, in some embodiments, the automated cleaning system includes an automated sprayer configured to spray a disinfectant on the surface after being touched and/or the air around the charging base 118.

In some arrangements, the automated cleaning system is configured to disinfect the user interface 106 surface after each use. In some arrangements, the automated cleaning system may be configured to disinfect the user interface 106 surface after health monitoring system 188 determines that a worker 102 engaging with the user interface 106 is likely to have a fever. In some arrangements, the automated cleaning system is configured to perform a quick disinfection cycle of the user interface 106 surface after each use and perform a more thorough disinfection cycle after health monitoring system 188 determines that a worker 102 engaging with the user interface 106 is likely to have a fever.

Data Processing System 180:

In one or more shown arrangements, system 10 includes one or more data processing systems 180. Data processing system 180 is formed of any suitable size, shape and design and is configured to facilitate execution of the management software 108 and/or access controller 176, perform data analytics, implement various other modules, processes or software of system 10, and/or perform various operations, processes, and activities described herein and/or shown in the figures.

In one or more arrangements, for example, a data processing system 180 includes a circuit specifically configured and arranged to carry out one or more of these or related operations/activities. For example, data processing system 180 may be discreet logic circuits or programmable logic circuits configured and arranged for implementing these operations/activities, as shown in the figures, and/or described in the specification. In certain embodiments, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions which may be executed by a computer (or other electronic device) to perform these operations/activities.

In the arrangement shown in FIG. 20, as one example, system 10 includes a data processing system 180 communicatively connected to various components of system 10 via databases 34, user interface 106, and/or management software 108. In some example arrangements, data processing system 180 is configured to perform various tracking, data analytics, and/or other operations described using data provided from sensors 30,182, and/or 184 and/or data stored in database 34.

In the example arrangement shown in FIG. 20, data processing system 180 is illustrated as being separate from management software 108. However, the embodiments are not so limited. In various implementations, data analytics processes may be executed alongside management software 108 on data processing system 180. Additionally or alternatively, data analytics and/or other processes performed by data processing system 180 may in whole or in part be incorporated into and form part of management software 108.

Contact Tracing:

In one or more embodiments, data processing system 180 is configured to perform contact tracing. The data processing system 180 is configured to perform the contact tracing using any suitable set of operations, processes, and/or activities. In one example arrangement, data processing system 180 is configured to perform contact tracing for a worker 102 of interest (e.g., a worker 102 determined to have a fever) by analyzing data for workers 102 that is stored in database 34. For example, data processing system 180 may be configured to perform contact tracing for a worker 102 of interest by retrieving recent position data of workers 102 from database and cross-correlating the position data to identify other workers 102 who were recently positioned within a threshold proximity for a threshold period of time (e.g., within 6 ft for 10 or more minutes).

In one or more arrangements, data processing system 180 may routinely pre-process position data in (e.g., daily, weekly, or monthly) to identify occurrences in which two or more workers 102 are in close proximity to one another. When exposure tracing is to be performed, the data processing system 180 can more quickly search the previously identified occurrences of close proximity to determine identify a subset of the occurrences, which involve the worker 102 of interest. The data processing system 180 then processes the subset of the occurrences to identify all other workers 102 involved. In such example arrangements, the data processing system 180 may generate a report listing all of the identified workers 102 having an occurrence of close proximity with the worker 102 of interest. In one or more arrangements, data processing system 180 is further configured to rank the identified workers 102 in the report based on the number of occurrences of close proximity in which each worker 102 was involved. Ranking of identified workers 102 based on the number of occurrences may help safety manager 112 prioritize notification and assessment of workers 102 having a higher risk of being exposed.

Additionally or alternatively, in one or more embodiments, data processing system 180 may be configured to identify workers 102 that may have been exposed by first identifying hot zones in which the worker 102 of interest most recently spent extended periods of time. For example, data processing system 180 may identify exposed workers 102 by retrieving position data from database 34 for the worker 102 of interest for the infectious time period and processing the position data of the worker 102 to identify clusters. Data processing system 180 may identify clusters using one or more known clustering algorithms including but not limited to, for example, K-means, fuzzy K-means hierarchical clustering, and/or mixture of gaussians. In one or more arrangements, data processing system 180 defines areas containing the clusters as hot zones. The data processing system 180 then searches recent position data in database 34 for other workers 102 to identify workers 102 who had contact with one or more hot zones. In one or more arrangements, the data processing system 180 generates a report listing all of the identified workers 102 having contact with one or more hot zones.

In one or more arrangements, data processing system 180 is configured to determine a cumulative amount of time that each worker 102 was located in the hot zones. The data processing system 180 is further configured to rank the identified workers 102 in the report based on the determined cumulative time they work located in the hot zones. Ranking of identified workers 102 based on the cumulative time in the hot zones may help safety manager 112 prioritize notification and assessment of workers 102 having a higher risk of being exposed.

In one or more arrangements, data processing system 180 is configured to perform a one or more actions in response to identifying hot zones or workers 102 who may have been exposed. For example, in one or more arrangements, data processing system 180 is configured to automatically generate a request for prioritized cleaning of hot zone areas following identification of the hot zones. As another example, in one or more arrangements, in response to identifying a set of workers 102 are risk having bene exposed, data processing system 180 is configured to send notification (e.g., email, SMS, and/or phone call) to safety manager 112 or the identified workers 102.

In some arrangements, the data processing system 180 is configured to perform contact tracing for a worker 102 of interest in response to a command input, for example, by safety manager 112 via management software 108. Additionally or alternatively, in some arrangements, the data processing system 180 may be configured to perform contact tracing for a worker 102 of interest in response to health monitoring system 188, determining that the worker 102 is likely to have a fever.

Health & Safety Compliance and Analytics:

In one or more embodiments, data processing system 180 is configured to monitor compliance with one or more health and safety policies. The data processing system 180 is configured to monitor health and safety policies using any suitable set of operations, processes, and/or activities.

Social Distancing Policy Management:

In one example arrangement, data processing system 180 is configured to monitor compliance with a social distancing policy by analyzing position data of workers 102 stored in database 34. In this example arrangement, data processing system 180 is configured to retrieve position data from database 34 for a specified time period of interest. Data processing system 180 analyzes the retrieved position data to identify instances the social distancing policy was violated, for example, due to proximity of workers, or capacity of area violating limits set forth in the policy.

After identifying violations, data processing system 180 may be configured to generate one or more reports based on the identified violations. An example report may specify, for example, each worker 102 having a policy violation, frequency of policy violations and/or details of violations (average proximity of violation and/or average time of each violation). Another example report may describe area or locations in which capacity exceeded limits set forth in the policy.

In one or more arrangements, data processing system 180 may evaluate positions of proximity based violations to identify high-congestion or high-traffic locations in which social distancing policies may need to be adjusted. In an example arrangement, data processing system 180 is configured to high-congestion or high-traffic locations by clustering the identified violations based on position at which the violations occurred. As described with reference to contact tracing, data processing system 180 may identify clusters using one or more known clustering algorithms including but not limited to, for example, K-means, fuzzy K-means hierarchical clustering, and/or mixture of gaussians. After clustering, the data processing system 180 identifies clusters having a number of violations that exceed a threshold. The data processing system 180 may be configured to generate a report describing locations corresponding to the identified clusters and describing the policy violations that occurred at each location.

Worker Density Metrics:

In addition to or in lieu of monitoring policy compliance, in one or more arrangements, data processing system 180 is configured analyze data in database 34 to generate other data metrics and/or reports to enhance and facilitate social distancing. For example, in one or more arrangements, data processing system 180 is configured evaluate position data of workers 102 to assess worker density. In this example arrangement, the data processing system 180 is configured to use position data of workers 102 to quantify worker density, for example, as the number of workers per unit area. In some various arrangements, the data processing system 180 may generate reports, e.g., tables, charts, graph, maps, showing worker density, for example, for different jobs, workplace areas, different departments, groups and/or individual workers, and/or different shifts or times of day.

As an illustrative example, in one or more arrangements, data processing system 180 is configured to identify workspace areas with the highest density of workers 102 and workspace areas having the lowest density of workers 102. Data processing system 180 may generate a report identifying the highest and lowest density workspace areas to facilitate relocation of workers 102 to maximize social distancing among workers 102.

As another illustrative example, in one or more arrangements, data processing system 180 is configured to quantify workers density for individual workers 102 as the average worker density of the workplace areas where a worker 102 is located throughout the day. Data processing system 180 may generate a report identifying workers 102 having the highest measurement of worker density. Worker density assessment for individual employees may be useful, for example, to prioritize allocation of personal protection equipment (e.g., gloves, masks, and respirators) to workers 102 who work in high worker density with others.

In one or more arrangements, the data processing system 180 may be configured identify workers having a high worker density by: retrieving position data from database 34 for a sample number of days and evaluating the position data for each worker 102 to determine the locations of the worker 102 and worker density of the determined locations at a plurality of different times throughout a workday. The data processing system 180 then averages the determined worker densities to quantify a worker density assessment for the individual worker 102. Data processing system 180 may repeat this process for a plurality of workers and rank the workers 102 based on the determined worker density assessment to identify workers 102 having the highest worker density assessments.

As another example, in one or more arrangements, data processing system 180 is configured to evaluate position data of workers 102 to quantify worker density based on the levels of interaction with other workers 102. For instance, data processing system 180 use an interaction based quantification of worker density to identify workers 102 whose jobs involve a high level of interaction with other employees (e.g., intra-office mail service). Knowledge of workers 102 whose jobs involve a high levels of interaction may be useful, for example, to prioritize distribution of personal protection equipment. In one or more arrangements, the data processing system 180 may be configured identify high interaction by: retrieving position data from database 34, for a sample number of days, and evaluating the position data for each worker 102 to determine the number of other workers 102 encountered (e.g., with which the worker 102 was within a threshold proximity). Data processing system 180 may then rank the workers 102 based on the number of other employees to identity workers 102 having the highest interaction with other workers.

Sneeze Detection:

In yet another example arrangement, data processing system 180 is configured to analyze data of sound sensors 30A and/or accelerometer 32 of workers 102 to automatically identify occurrences of motions and sound characteristic of a coughs or sneeze. Identification of such occurrences may be helpful to facilitate early identification of a contagious worker 102 so measures may be taken to mitigate exposure of other (e.g., increased separation of worker 102 or distribution of personal protection equipment). In this example arrangement, data processing system 180 may be configured to regularly retrieve sound sensors 30A data and accelerometer 32 data of workers 102 from database 34 for evaluation (e.g., daily, weekly, or monthly). After retrieving the data, data processing system 180 processes the data using, for example a classifier or state machine that is trained to detect signatures of a cough and/or sneeze. After process the data to identify coughs and/or sneezes, data processing system 180 determines a set of workers 102 having a number of coughs and/or sneezes exceeding a specified threshold. Data processing system 180 then generates a report identifying the set of workers.

Repetitive Motion Identification and Assessment:

In yet another example arrangement, data processing system 180 is configured to analyze data of accelerometer 32 to identify repetitive motions which may lead to injury over time. Identification of repetitive motions may be helpful to facilitate development and execution of measures to avoid such injury. In this example arrangement, data processing system 180 may be configured to regularly retrieve accelerometer 32 data of workers 102 from database 34 for evaluation (e.g., daily, weekly, or monthly). After retrieving the data, data processing system 180 processes the data using, for example, a classifier or state machine that is trained to detect and group similar motion events. After processing the data to identify coughs and/or sneezes, data processing system 180 determines a set of workers 102 in which a motion or similar group of motions is identified with high number of occurrences (e.g., exceeding a specified threshold. Data processing system 180 then generates a report identifying the set of workers.

In one or more arrangements, data processing system 180 is configured to quantify the level of repetitive motions performed by a worker. For example, in one or more arrangements, data processing system 180 may be configured to quantity repetitive motions based on the number of instances that a worker 102 performs the identified repetitive motions in a certain period of time (e.g., day, week, month). In some various arrangements, the data processing system 180 may generate reports, e.g., tables, charts, graph, maps, showing the quantified repetitive motion, for example, for different jobs, workplace areas, different departments, groups and/or individual workers, and/or different shifts or times of day.

Total Physicality Assessment:

In yet another example arrangement, data processing system 180 is configured to analyze data provided by sensors 30 to assess the physical exertion of workers 102. Identification of repetitive motions may be helpful to identify jobs requiring high levels of physical exertion. In one or more arrangements, data processing system 180 may be configured to quantify the total physicality of tasks performed by workers 102 based on heart rate, temperature, perspiration level, number of steps, distance traveled, accelerometer data, and/or other data acquired by sensors 30 or determined by data processing system 180 using data analytics (e.g., the determined repetitive motion quantification). In some various arrangements, the data processing system 180 may generate reports, e.g., tables, charts, graph, maps, showing the determined total physicality level, for example, for different jobs, workplace areas, different departments, groups and/or individual workers, and/or different shifts or times of day.

Personal Health Profiles:

In one or more arrangements, system 10 is configured to aggregate and arrange biometric data and/or other health related data measured by sensors 30, 182, and/or 184) of workers 102 in database and the data processing system 180. In some arrangements, data processing system 180 is configured to compile and arrange the biometric data and/or other health related data of workers 102 into personal health profiles. The personal health profiles may track and indicate monitor various health related metrics for easy review and comparative assessments by the workers 102 or authorized persons. Such metrics may include, for example, average measurement and/or typical range for various biometric measurements (e.g., temperature, heart rate, perspiration level, etc.) and/or environmental measurements (e.g., air quality, air temperature, etc. In one or more arrangements, data processing system 180 is configured to perform data analytics to identify deviations from the average/typical readings in the personal health profile and provide notification to the worker 102 or another authorized person. In some arrangements, health monitoring system compares biometric measurements of the worker 102 to the worker's 102 personal health profile to determine if the worker 102 is in good health (e.g., in performing entrance screening). In one or more arrangements, data processing system 180 is configured to aggregate and anonymize data from a larger number of personal health profiles for evaluation or report generation.

Machine Learning:

In one or more embodiments, data processing system 180, management software, and/or other components of system 10 may be configured and arranged to monitor, learn, and modify one or more features, functions, and/or operations of the system. For instance, data processing system 180 may be configured to monitor and/or analyze data stored in database 34 and/or operation of system 10. As one example, in one or more arrangements, data processing system 180 may be configured to analyze the data and learn, over time, data metrics indicative of an employee being infected by a contagion before the employee exhibits symptoms (e.g., raised temperature). Such learning may include, for example, generation and refinement of classifiers and/or state machines configured to map input data values to outcomes of interest or to operations to be performed by the system 10. In various embodiments, analysis by the data processing system 180 may include various guided and/or unguided artificial intelligence and/or machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

From the above discussion it will be appreciated that the safety device, system, and method of use presented improves upon the state of the art. Specifically, the safety device, system and method of use presented: standardizes the collection of information about the environmental conditions of a workplace; does not penalize any one employee for reporting information about the environmental conditions of a workplace; aggregates a great amount of information about the environmental conditions of a workplace; eliminates the bias in the collection of information about the environmental conditions of a workplace; eliminates the inconsistency in reporting information about the environmental conditions of a workplace; provides workers the ability to quickly and easily report near misses; allows for the prediction of future workplace injuries; allows for the elimination of future workplace injuries; provides insight into the safety conditions of a workplace; allows for the identification of patterns in safety conditions; reports information about the environmental conditions of a workplace without substantially inconveniencing workers; provides notifications if safety thresholds are approached or exceeded; improves the access to information about the environmental conditions of a workplace; improves the visibility to information about the environmental conditions of a workplace; reduces workplace injuries; improves the safety of workers and work places; is safe to use; is easy to use; is efficient to use; is cost effective; is durable; is robust; can be used with a wide variety of manufacturing facilities; is relatively inexpensive to implement; has a long useful life; is high quality; is convenient; can be used with a wide variety of employees; provides high quality data; provides data and information that can be relied upon; reduces response time to potentially dangerous situations; facilitates tracking clock in and clock out times for worker shifts and reporting information; standardizes the collection of information related to health of workers in the workplace; monitors health of workers; screens workers for signs of fever; facilitates monitoring and/or control over access to company resources by workers; aggregates a great amount of information related to employee health to facilitate data analytics; facilitates contact tracing of workers after identifying a contagious worker; that facilitates monitoring, management, and/or improvement of health safety policies; that provides insight into the health conditions of a workplace; reports information about the health conditions of workers without substantially inconveniencing workers; provides notifications if health safety polices are violated; and/or reduces workplace illness, among countless other advantages and improvements.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention.

Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure. Moreover, although some disclosed embodiments may be primarily described in the context of worker 102 health and safety, the embodiments are not so limited. In is appreciated that the embodiments may be adapted for use in other applications which may be improved by the disclosed structures, arrangements and/or methods.

It will be appreciated by those skilled in the art that other various modifications could be made to the device without parting from the spirit and scope of this disclosure. All such modifications and changes fall within the scope of the claims and are intended to be covered thereby.

For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. Conversely, although aspects and features may be illustrated in or described as being combined in a system, it will be appreciated that one or more embodiments may include one such aspects or features individually without the other even though not explicitly shown or explicitly described outside of the combination.

What is claimed:

1. A system for monitoring worker activity, comprising:
a wearable device;
the wearable device configured to be worn by a worker during a work shift;
the wearable device having a plurality of sensors;
the plurality of sensors including a sound sensor;
the wearable device including a first event trigger and a second event trigger;
a data processing system;
wherein in response to the worker engaging the first event trigger or the second event trigger, the wearable device is configured to record a voice recording using the sound sensor and communicate the voice recording to the data processing system;
wherein in response to receiving a voice recording in response to the first event trigger the data processing system is configured to perform a first set of actions;
wherein in response to receiving a voice recording in response to the second event trigger the data processing system is configured to perform a second set of actions.

2. The system of claim 1, wherein the first set of actions has a higher priority than the second set of actions.

3. The system of claim 1, wherein the first event trigger is engaged by the worker pressing a first button on the wearable device;
wherein the second event trigger is engaged by the worker pressing a second button on the wearable device.

4. The system of claim 1, wherein the first event trigger is engaged by the worker pressing a button on the wearable device a first number of times;
wherein the second event trigger is engaged by the worker pressing the button on the wearable device a second number of times, wherein the first number of times and the second number of times is different.

5. The system of claim 1, wherein the first set of actions includes creating an event report, adding the voice recording to the event report, and communicating the event report to a manager.

6. The system of claim 1, wherein the first set of actions includes creating an event report, transcribing the voice recording, adding a transcription of the voice recording to the event report, and communicating the event report to a manager.

7. The system of claim 1, wherein the first event trigger is configured to be used with a safety related matter.

8. The system of claim 1, wherein the first event trigger is configured to be used with a non-safety related matter.

9. A system for monitoring worker activity, comprising:
a wearable device;
the wearable device configured to be worn by a worker during a work shift;
the wearable device having a plurality of sensors;
the plurality of sensors including a sound sensor;
the wearable device including a button;
wherein in response to the worker engaging the button, the wearable device is configured to record a voice recording using the sound sensor and communicate the voice recording to a data processing system;
wherein in engaging the button, in response to the worker pressing the button in a first manner, the wearable device is configured to communicate data to the data processing system indicating that the voice recording is a safety related matter;
wherein in engaging the button, in response to the worker pressing the button in a second manner, the wearable device is configured to communicate data to the data processing system indicating that the voice recording is a non-safety related matter;
wherein the first manner of pressing the button is different from the second manner of pressing the button.

10. The system of claim 9,
wherein in engaging the button, in response to the worker pressing the button in a first manner, the wearable device is configured to communicate data to the data processing system indicating that the voice recording is a safety related matter;
wherein in engaging the button, in response to the worker pressing the button in a second manner, the wearable device is configured to communicate data to the data processing system indicating that the voice recording is a non-safety related matter;
wherein the first manner of pressing the button is different from the second manner of pressing the button.

11. The system of claim 9,
further comprising the data processing system;
wherein in response to receiving a voice recording for a safety related matter, the data processing system is configured to perform a first set of actions;
wherein in response to receiving a voice recording for a non-safety related matter, the data processing system is configured to perform a second set of actions.

12. The system of claim 9, further comprising the data processing system;
wherein the data processing system is configured to determine if the voice recording received from the wearable device is for a safety related matter or a non-safety related matter;
wherein in response to determining that the voice recording is for a safety related matter, sending an alert message to a manager.

13. The system of claim 9, wherein the first manner of pressing the button includes pressing the button a first number of times;
wherein the second manner of pressing the button includes pressing the button a second number of times;
wherein the first number of times is different from the second number of times.

14. A system for monitoring worker activity, comprising:
a wearable device;
the wearable device configured to be worn by a worker during a work shift;
the wearable device having a set of one or more sensors;
the set of one or more sensors including a sound sensor;
the wearable device including a first event trigger and a second event trigger;
wherein in response to the first event trigger or the second event trigger being engaged the wearable device is configured to record a voice recording using the sound sensor;
wherein in further response to the first event trigger being engaged, the wearable device is configured to send the voice recording and data indicating that the voice recording is a safety related matter to a data processing system;

wherein in further response to the second event trigger being engaged, the wearable device is configured to send the voice recording and data indicating that the voice recording is a non-safety related matter to a data processing system.

15. The system of claim 14, wherein the first event trigger is engaged by pressing a button in a first manner;

wherein the second event trigger is engaged by pressing the button in a second manner.

16. The system of claim 14, further comprising the data processing system.

17. The system of claim 14, wherein in response to receiving the voice recording with the data indicating that the voice recording is a safety related matter the data processing system is configured to perform a first set of actions;

wherein in response to receiving the voice recording with the data indicating that the voice recording is a non-safety related matter the data processing system is configured to perform a second set of actions.

18. The system of claim 14, wherein the first event trigger is engaged by the worker pressing a first button on the wearable device;

wherein the second event trigger is engaged by the worker pressing a second button on the wearable device.

19. The system of claim 14, wherein the first event trigger is engaged by the worker pressing a button on the wearable device a first number of times;

wherein the second event trigger is engaged by the worker pressing the button on the wearable device a second number of times, wherein the first number of times and the second number of times is different.

* * * * *